US012477391B2

United States Patent
Kwak et al.

(10) Patent No.: US 12,477,391 B2
(45) Date of Patent: Nov. 18, 2025

(54) OPERATING METHOD OF UE, RELATED TO SENSOR RAW DATA SHARING AND FEEDBACK IN WIRELESS COMMUNICATION SYSTEM

(71) Applicant: LG Electronics Inc., Seoul (KR)

(72) Inventors: Minsung Kwak, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 18/041,309

(22) PCT Filed: Aug. 10, 2021

(86) PCT No.: PCT/KR2021/010573
§ 371 (c)(1),
(2) Date: Feb. 10, 2023

(87) PCT Pub. No.: WO2022/035182
PCT Pub. Date: Feb. 17, 2022

(65) Prior Publication Data
US 2024/0015583 A1  Jan. 11, 2024

(30) Foreign Application Priority Data

Aug. 12, 2020 (KR) .................. 10-2020-0101134
Mar. 17, 2021 (KR) .................. 10-2021-0034781

(51) Int. Cl.
*H04W 28/02* (2009.01)
*H04W 8/18* (2009.01)

(52) U.S. Cl.
CPC ......... *H04W 28/0289* (2013.01); *H04W 8/18* (2013.01)

(58) Field of Classification Search
CPC ... H04W 84/18; H04W 8/005; H04W 12/009; H04W 24/08; H04W 4/02; H04W 74/0816; H04W 28/0289; H04W 8/18
See application file for complete search history.

(56) References Cited

U.S. PATENT DOCUMENTS

| | | | |
|---|---|---|---|
| 2010/0146064 A1* | 6/2010 | Son | H04L 12/2827 709/206 |
| 2013/0029636 A1* | 1/2013 | Ivanov | H04W 4/70 455/410 |
| 2013/0031590 A1* | 1/2013 | Ivanov | H04N 21/4668 725/110 |

(Continued)

FOREIGN PATENT DOCUMENTS

| | | | | |
|---|---|---|---|---|
| EP | 3654676 A1 * | 5/2020 | | G08G 1/0133 |
| JP | 2019220858 A * | 12/2019 | | |

*Primary Examiner* — Dung Hong
(74) *Attorney, Agent, or Firm* — Fish & Richardson P.C.

(57) ABSTRACT

In one embodiment, an operating method of a first UE, related to high-definition stream management (HDSM) in a wireless communication system, comprises: transmitting, by the first UE, a message related to sharing of sensor raw data; receiving, by the first UE, a subscription related to the sharing of the sensor raw data from a second UE; and transmitting, by the first UE, a notification about the subscription to the second UE, wherein, the first UE performs congestion control on a list related to the subscription and/or on the format of the sensor raw data on the basis of the reception of the feedback about the sensor raw data from the second UE.

13 Claims, 24 Drawing Sheets

(56) References Cited

U.S. PATENT DOCUMENTS

| | | | |
|---|---|---|---|
| 2013/0041755 A1* | 2/2013 | Ivanov | G06Q 30/06 |
| | | | 705/14.64 |
| 2021/0082210 A1* | 3/2021 | Sakr | G07C 5/008 |
| 2023/0180041 A1* | 6/2023 | Vassilovski | H04L 67/12 |
| | | | 370/229 |

* cited by examiner (a)

(b)

(a)

(b)

OPERATING METHOD OF UE, RELATED TO SENSOR RAW DATA SHARING AND FEEDBACK IN WIRELESS COMMUNICATION SYSTEM

CROSS-REFERENCE TO RELATED APPLICATIONS

This application is a National Stage application under 35 U.S.C. § 371 of International Application No. PCT/KR2021/010573, filed on Aug. 10, 2021, which claims the benefit of Korean Application Nos. 10-2021-0034781, filed on Mar. 17, 2021, and 10-2020-0101134, filed on Aug. 12, 2020. The disclosures of the prior applications are incorporated by reference in their entirety.

TECHNICAL FIELD

The present disclosure relates to a wireless communication system, and more particularly to a message between ITS-stations for raw data sensor sharing, a message exchange procedure, protocols, a feedback exchange method, a congestion control method, etc.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates.

Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (RD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (B S). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

An object of the present disclosure is to provide a message between ITS-stations for raw data sensor sharing, a message exchange procedure, protocols, a feedback exchange method, a congestion control method, etc.

In accordance with an aspect of the present disclosure, a method for operating a first user equipment (UE) related to high definition stream management (HDSM) in a wireless communication system may include transmitting, by the first UE, a message related to sharing of sensor raw data; receiving, by the first UE, a subscription related to the sharing of the sensor raw data from a second user equipment (UE); and transmitting, by the first UE, a notification for the subscription to the second UE. Based on a situation in which the first UE receives feedback for the sensor raw data from the second UE, the first UE performs congestion control for at least one of a list related to the subscription or a format of the sensor raw data.

In accordance with another aspect of the present disclosure, a first user equipment (UE) for use in a wireless communication system may include at least one processor; and at least one computer memory operatively connected to the at least one processor, and configured to store instructions such that the at least one processor performs specific operations by executing the instructions, wherein the specific operations include: broadcasting a message related to sharing of sensor raw data; receiving a subscription related to the sharing of the sensor raw data from a second user equipment (UE); and transmitting a notification for the subscription to the second UE. Based on a situation in which the first UE receives feedback for the sensor raw data from the second UE, the first UE performs congestion control for at least one of a list related to the subscription or a format of the sensor raw data.

In accordance with another aspect of the present disclosure, a processor configured to perform operations of a user equipment (UE) in a wireless communication system may include: performing the operations: wherein the operations include: broadcasting a message related to sharing of sensor raw data; receiving a subscription related to the sharing of the sensor raw data from a second user equipment (UE); and transmitting a notification for the subscription to the second UE. Based on a situation in which the first UE receives feedback for the sensor raw data from the second UE, the first UE performs congestion control for at least one of a list related to the subscription or a format of the sensor raw data.

In accordance with another aspect of the present disclosure, a non-volatile computer-readable storage medium configured to store at least one computer program including instructions that, when executed by at least one processor, cause the at least one processor to perform specific operations for a user equipment (UE) may include performing the specific operations: wherein the specific operations include: broadcasting a message related to sharing of sensor raw data; receiving a subscription related to the sharing of the sensor raw data from a second user equipment (UE); and transmitting a notification for the subscription to the second UE. Based on a situation in which the first UE receives feedback for the sensor raw data from the second UE, the first UE performs congestion control for at least one of a list related to the subscription or a format of the sensor raw data.

The congestion control for the list related to the subscription is to terminate any one of two or more subscriptions of the second UE.

Transmission of raw data having a larger channel bandwidth from among the two or more subscriptions may be stopped.

The first UE may transmit a first notification related to the termination of the subscription.

The first notification may be configured with notificationType=1 (termination of subscription request) and ReasonCode=3 (channel is too busy).

The congestion control for the list related to the subscription is to modify a subscription corresponding to a resolution or bitrate that is equal to or greater than a preset reference The first UE may transmit a second notification related to modification of the subscription.

The second notification may be configured with notificationType=3 (modification of subscription request) and ReasonCode=3 (channel is too busy).

The first UE may transmit, to the second UE, information related to a format of the modified sensor raw data.

The second notification may correspond to MSG_HDDataNotification.

As is apparent from the above description, the embodiments of the present disclosure can configure the exchange procedure so as not to use unnecessary resources when sharing/exchanging raw data, and can implement efficient transmission by performing congestion control. In addition, the embodiments can transmit high-definition data (HDD), so that the risk of collision between ITS-stations can be reduced, and further reinforced V2X services can be provided.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "I" and "," should be interpreted as "and/or". For example, "A/B" may mean "A and/or B". Further, "A, B" may mean "A and/or B". Further, "AB/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
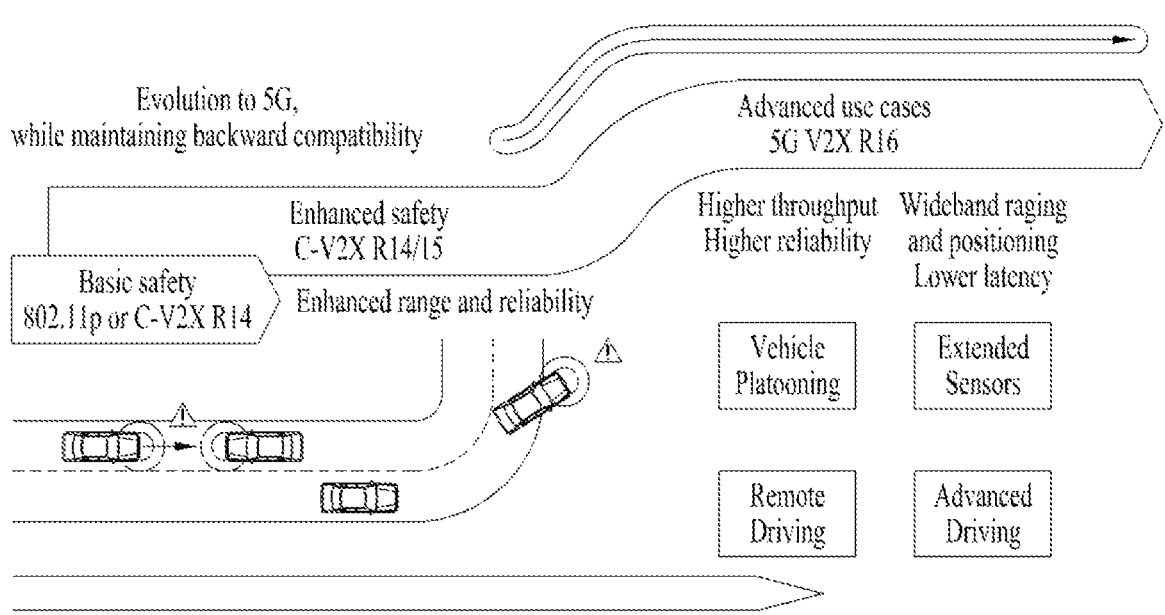
FIG. 1 is a diagram comparing vehicle-to-everything (V2X) communication based on pre-new radio access technology (pre-NR) with V2X communication based on NR.
Figure 2:
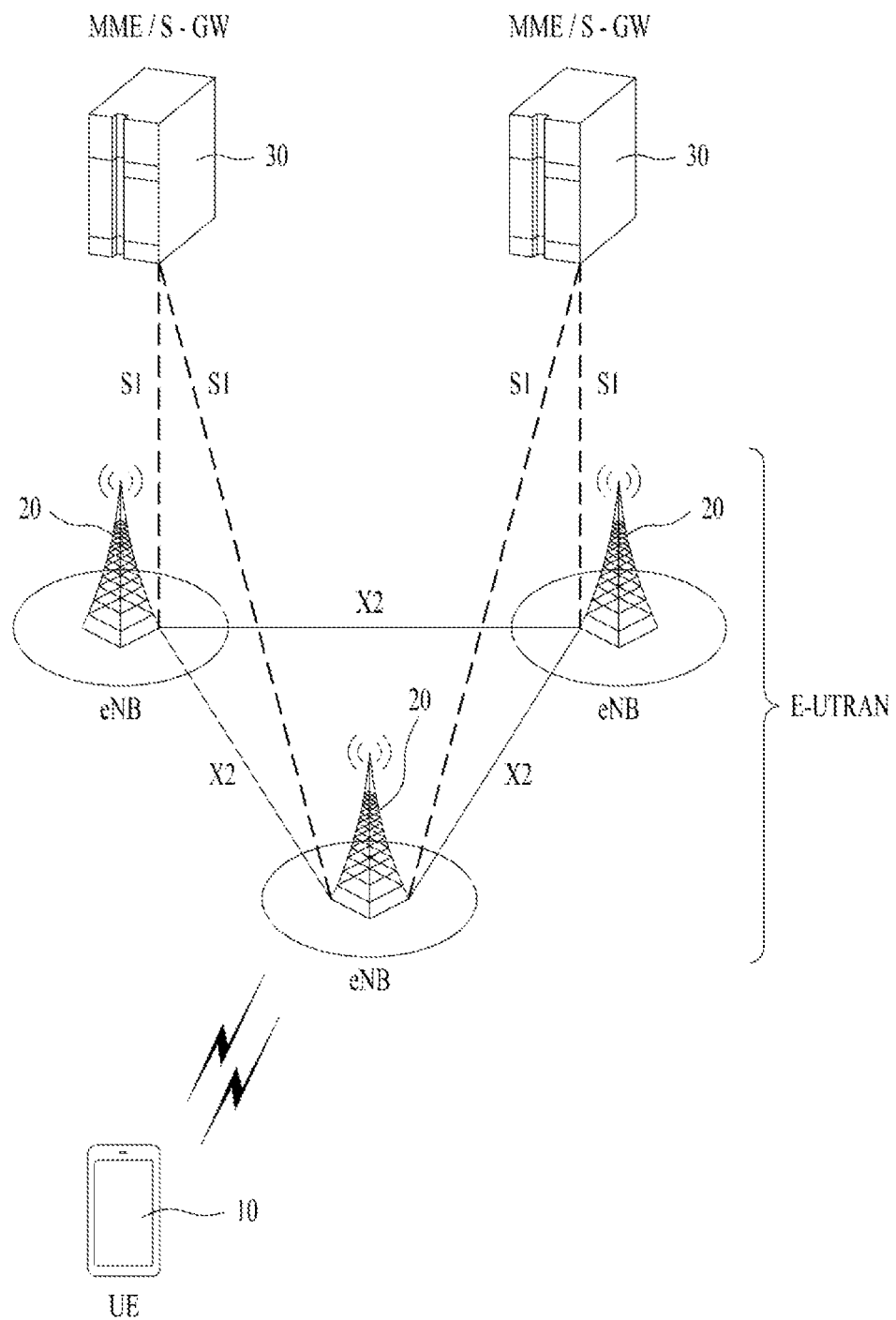
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
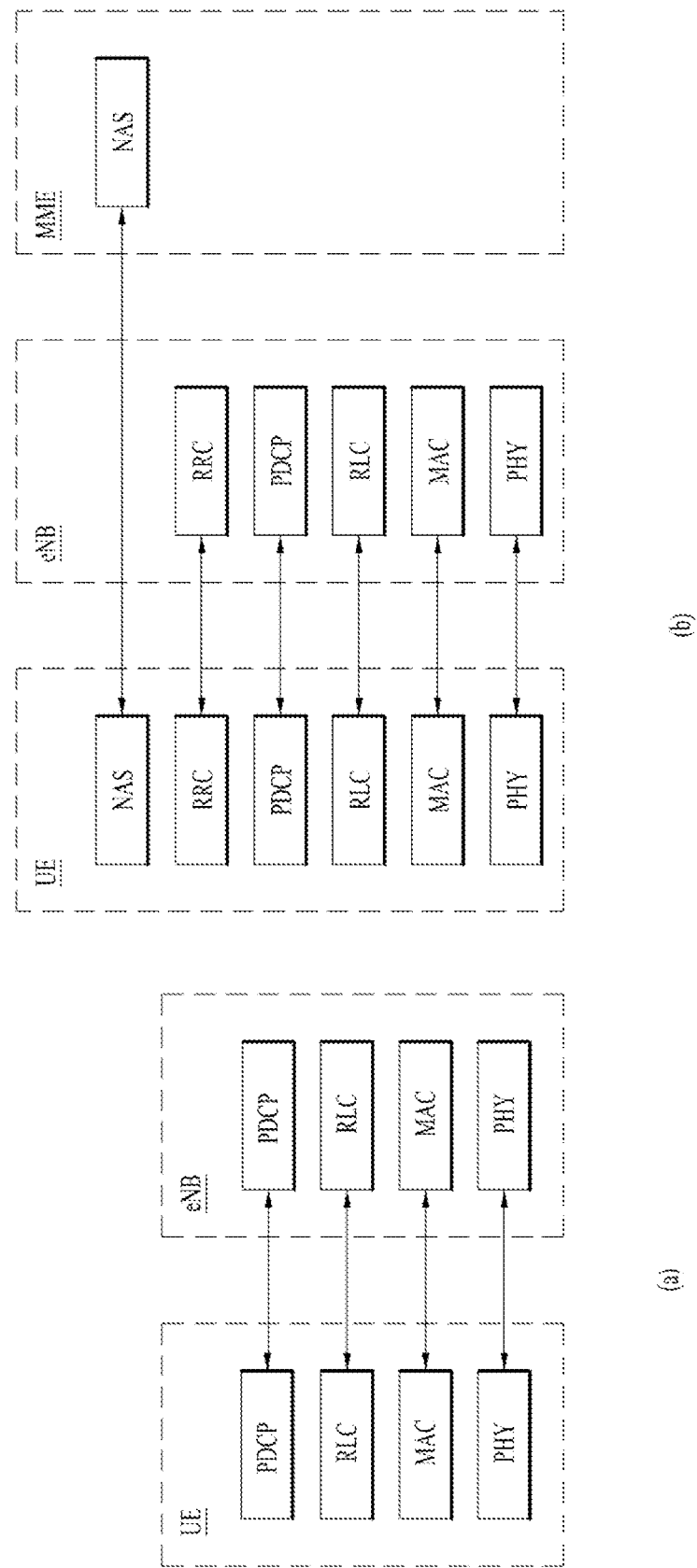
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC INACTIVE state is additionally defined. A UE in the RRC INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
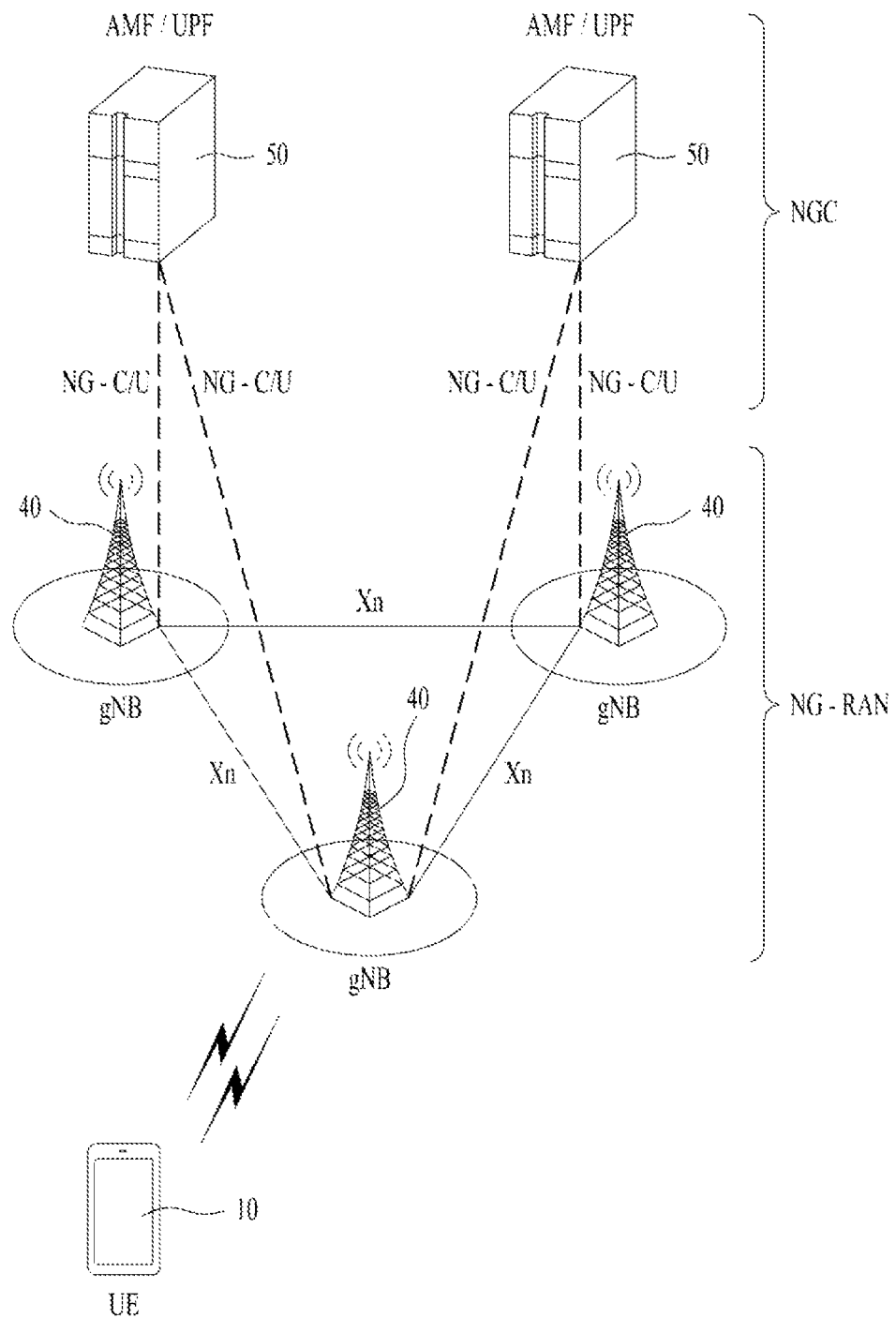
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
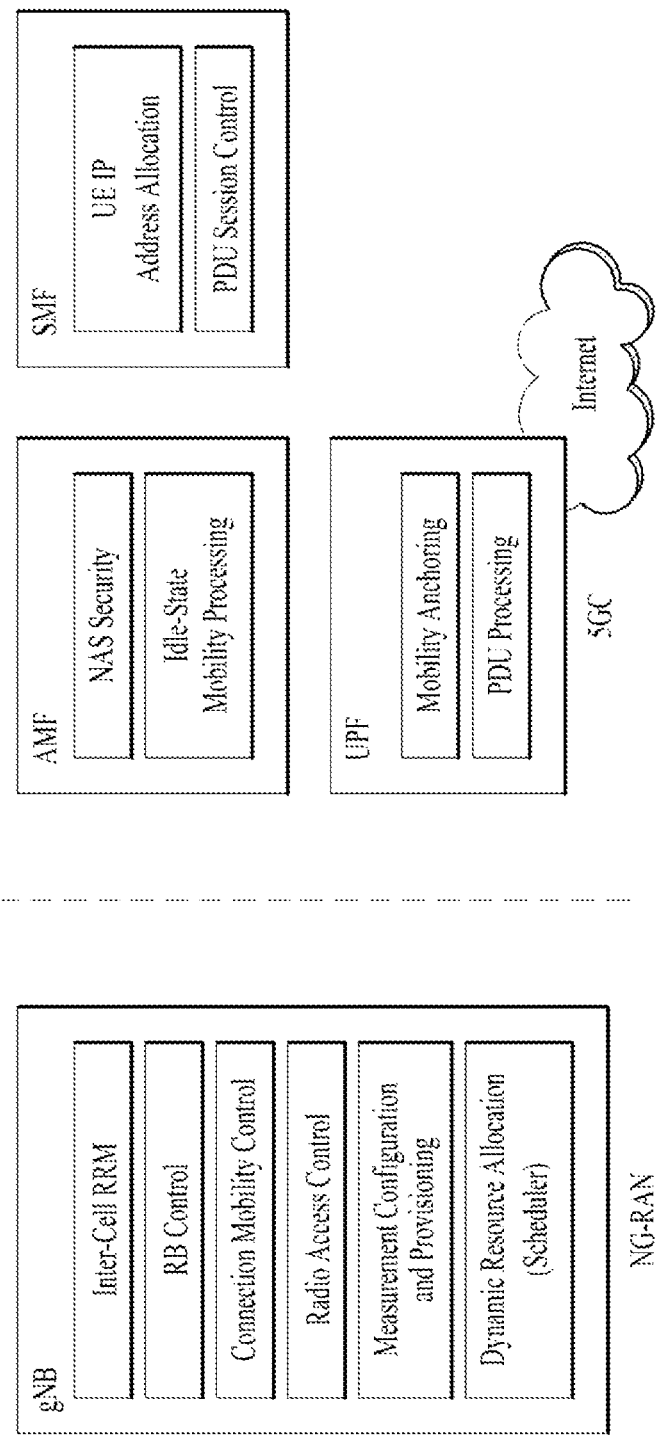
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
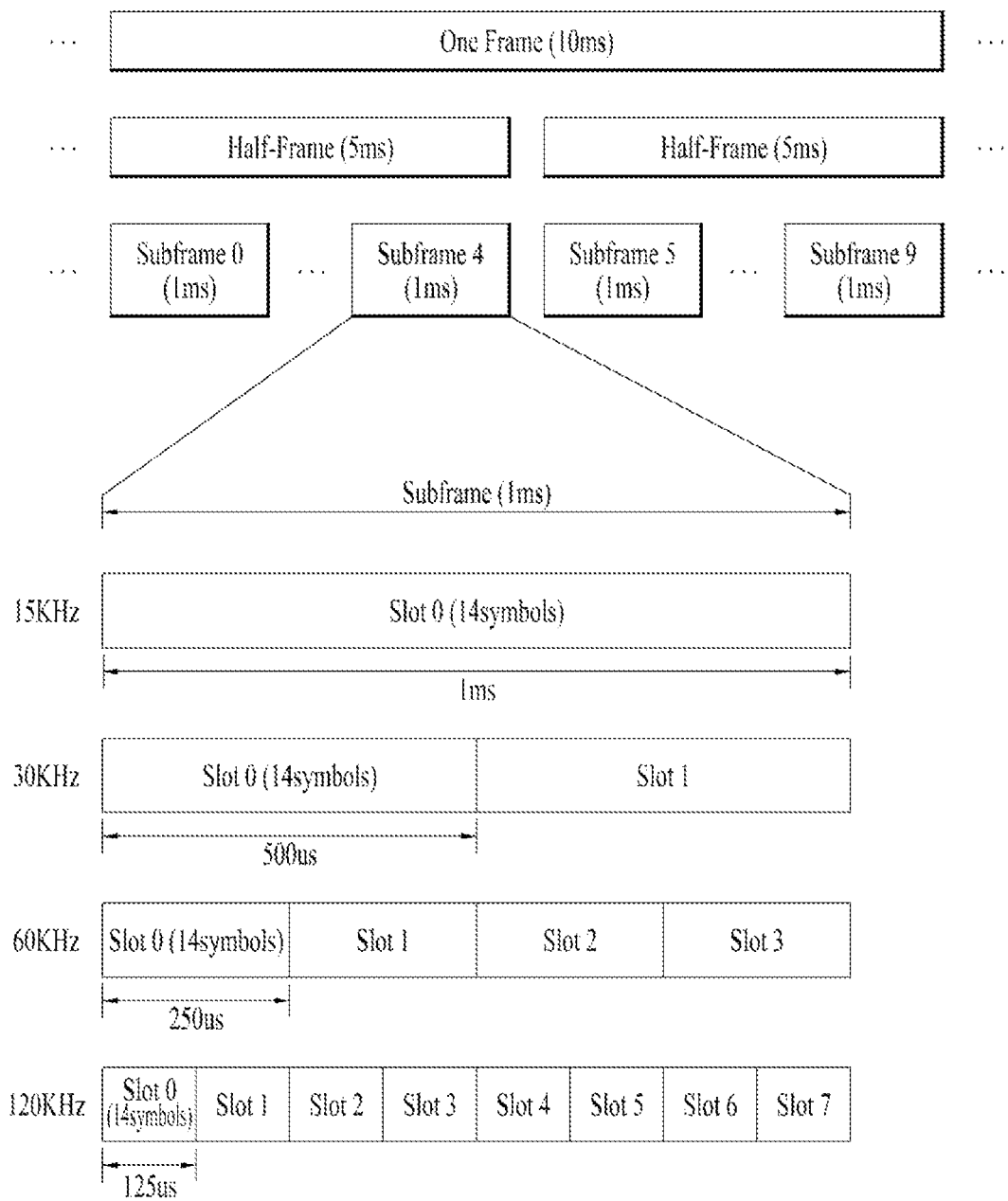
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
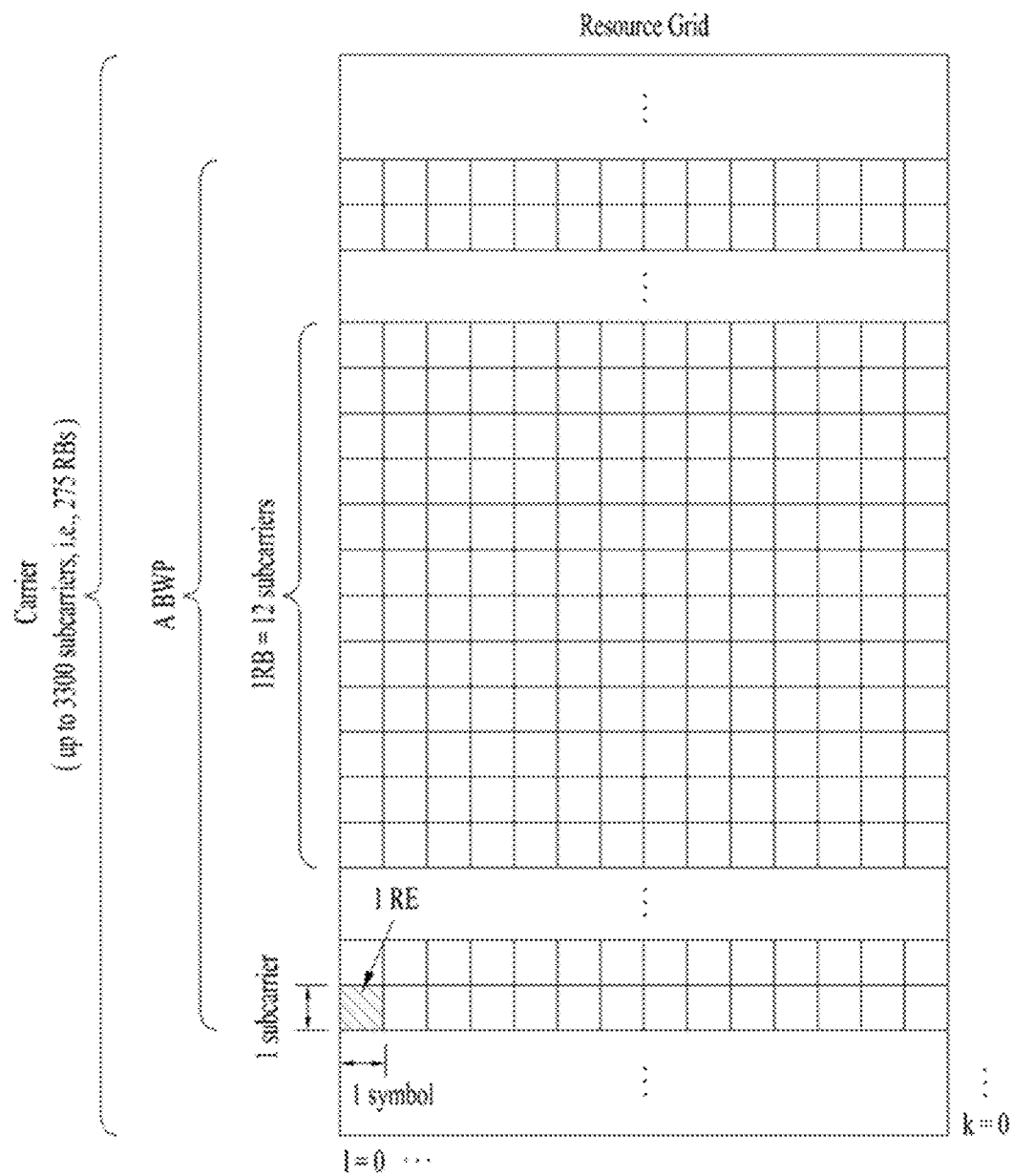
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
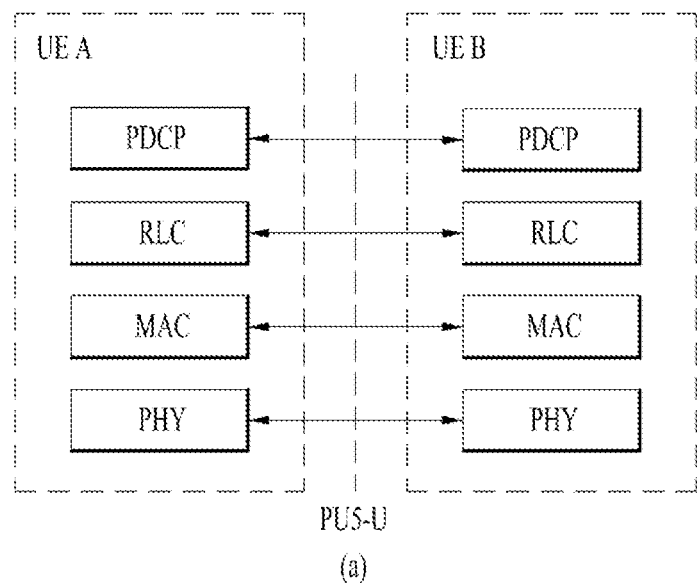
FIG. 8 is a diagram illustrating radio protocol architectures for sidelink (SL) communication according to an embodiment of the present disclosure.
Figure 8:
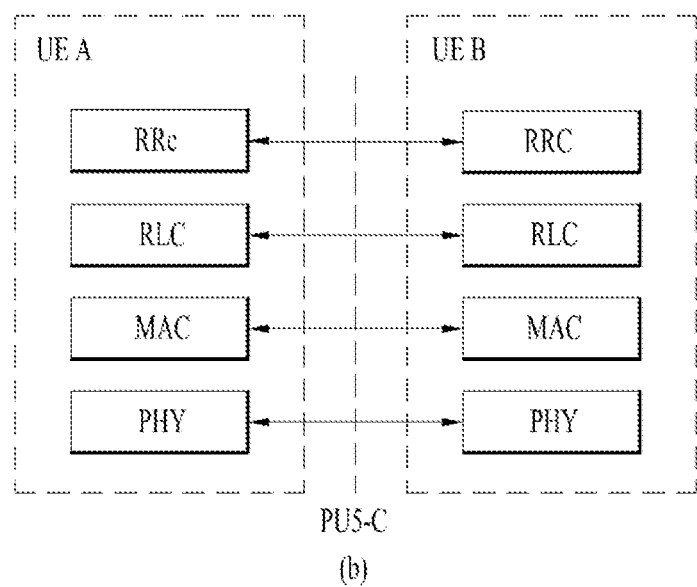

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
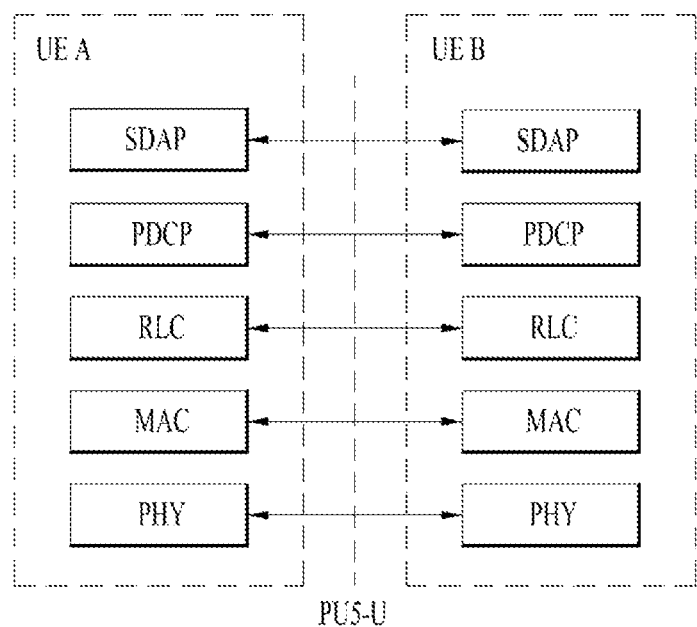
FIG. 9 is a diagram illustrating radio protocol architectures for SL communication according to an embodiment of the present disclosure.
Figure 9:
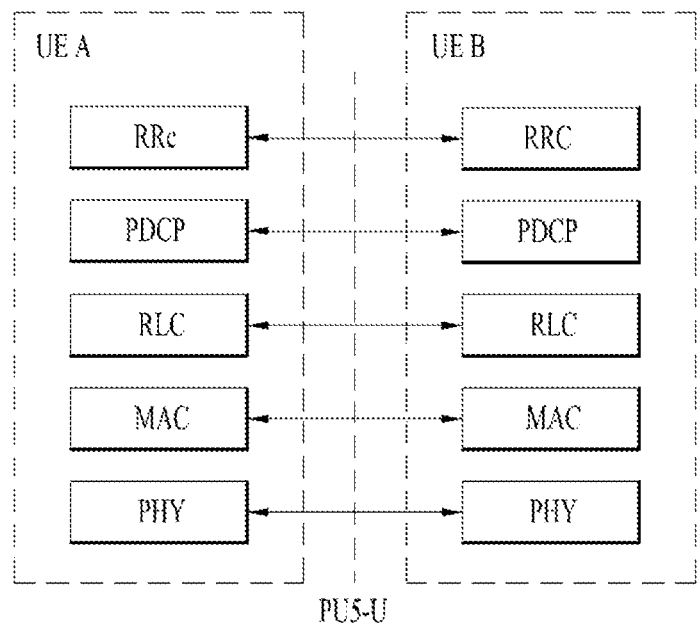

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
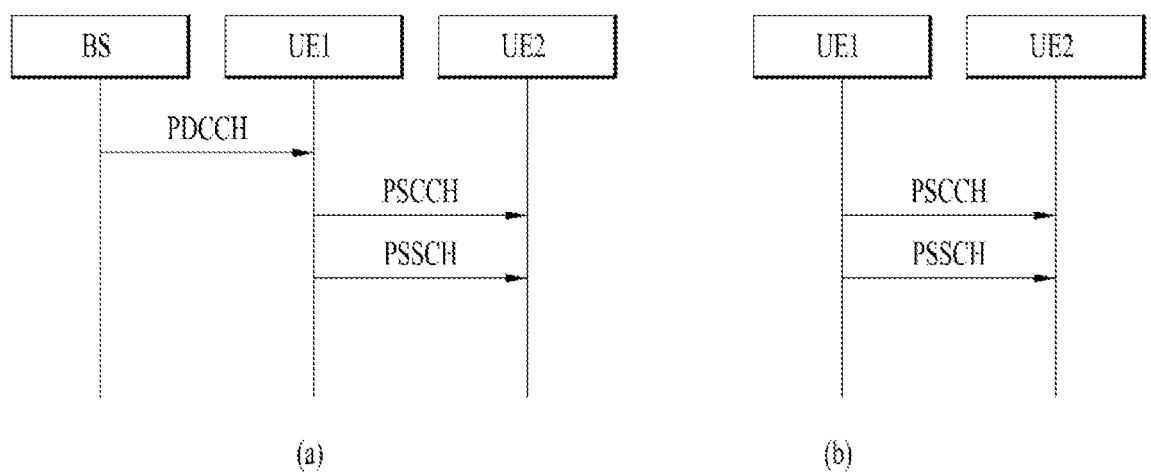
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

Sidelink control information (SCI) will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
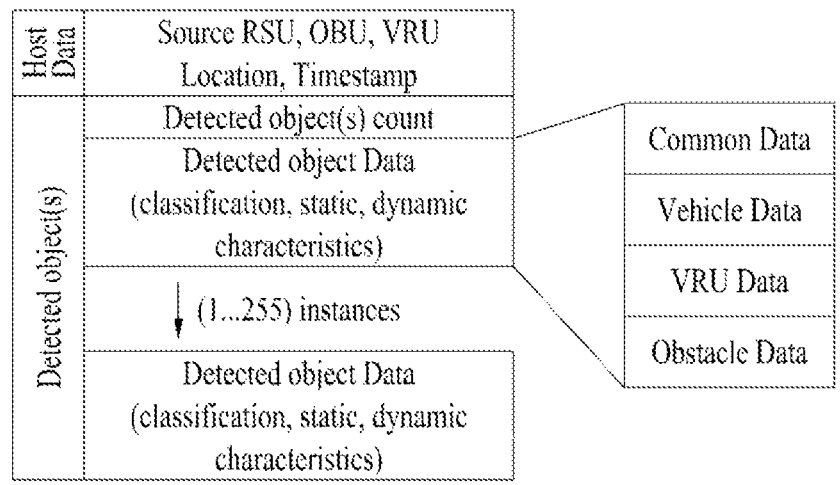
FIGS. 11 to 17 are diagrams illustrating the embodiment(s).

Meanwhile, FIG. 11 illustrates a conventional sensor sharing message high-level structure. In relation to the structure of FIG. 11, Table 5 shows SensorSharingMsg, and Table 6 shows DetectedObjectList.

TABLE 5

SensorSharingMsg ::= SEQUENCE {
  msgCnt MsgCount, -- Sequence number
  id OCTET STRING (SIZE(8)), -- temporary vehicle ID / RSU ID. SSM source.
  equipmentType EquipmentType, -- Sender type
  secMark DSecond, -- SSM transmission time
  refPos Position3D, -- Sender reference position
  objCount DetectedObjectCount, -- Number of reported detections
  objects DetectedObjectList -- detected objects
  ...
}

TABLE 6

DetectedObjectList::= SEQUENCE (SIZE(1..256)) OF DetectedObjectData
DetectedObjectData::= SEQUENCE {
  detObjCommon DetectedObjectCommonData, -- Common data for detected object
  detVeh DetectedVehicleData OPTIONAL, -- Detected vehicle data
  detVRU DetectedVRUData OPTIONAL, -- Detected VRU data
  detObst DetectedObstacleData OPTIONAL, -- Detected obstacle data
  ...
}

In relation to the above example, a sensor sharing message for listing the existing detected objects, vehicles, and VRUs may be transmitted to all peripheral ITS stations without a specific target. If the sensor sharing message includes the raw data measured by the sensor, a message sending/receiving procedure needs to be defined so that only the device requesting the raw data can receive this message rather than a message transmitted to all ITS stations. Whether to support download/storage/decoding may vary according to the capabilities of the received ITS station. In a situation where raw data is included in the message and the resultant message is then transmitted, the operation for allowing the reception ITS station to transmit unnecessary data may cause waste of an unnecessary bandwidth.

Therefore, various embodiments of the present disclosure may propose messages between ITS stations for raw data sensor sharing, a message exchange procedure, and a method for performing congestion control through protocol and feedback exchange. In addition, various embodiments of the present disclosure propose a method for performing congestion control using characteristics of raw data. In addition, various embodiments of the present disclosure propose a method for providing sensor raw data to a vehicle included in a section selected as a predetermined section.

Figure 12:
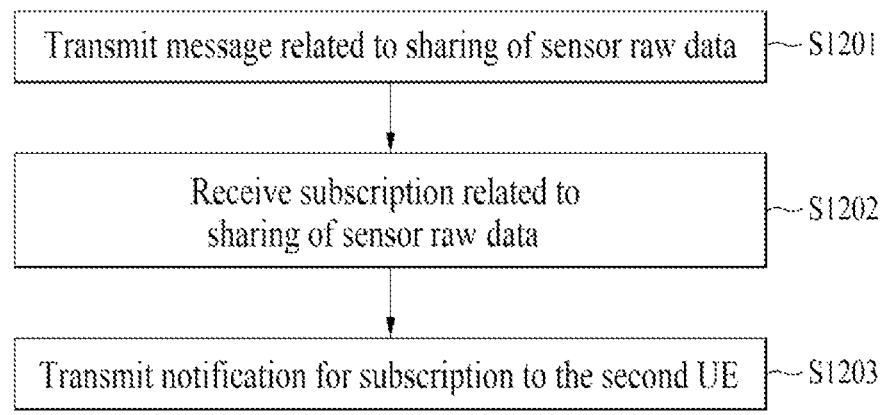

According to one embodiment, a first UE may transmit a message related to sharing of sensor raw data. Here, transmission may mean broadcast (see S1201 of FIG. 12). The first UE may receive a subscription related to sharing of sensor raw data from a second UE that has received a message related to sharing of sensor raw data (see S1202 of FIG. 12). The first UE may transmit a notification about the subscription to the second UE (see S1203 of FIG. 12). Through the above processes, the first UE can share/transmit sensor raw data with/to the second UE.

Here, based on the fact that the first UE has received feedback for the sensor raw data from the second UE, the first UE may perform congestion control for at least one of a list related to the subscription and a format of the sensor raw data. Hereinafter, the first UE may be referred to as a sharer because the first UE is an entity that shares the sensor raw data, the second UE may be referred to as a requester because the second UE is an entity that requests sensor raw data. In addition, the sensor raw data may be used as a raw file of the sensing data or a high-quality format file similar to this raw file.

Congestion control for the list related to the subscription may be used to terminate one of two or more subscriptions of the second UE. Specifically, transmission of raw data having a larger channel bandwidth among the two or more subscriptions can be stopped. In this case, the first UE may transmit a first notification related to the termination of the subscription, and the first notification may be set to notificationType=1 (termination of subscription request) and ReasonCode=3 (channel is too busy). The first notification may correspond to MSG_HDDataNotification to be described later.

More specifically, the first UE may receive a large amount of feedback information from the second UE according to a congestion state of a channel. When the first UE receives many more feedbacks than feedbacks that are set to a maximum threshold, the first UE may consider that the channel is in use, may select any one of the following congestion control methods, and can control the use of such channel using the selected method. The first UE may manage the subscription list of the second UE to control the channel busy ratio. As described above, when the second UE subscribes to two or more requests, the first UE may stop HDD transmission that requires more channel bandwidths for the second UE. The first UE may transmit, to the second UE, an HDD notification in which notificationType=1 ('termination of subscription request') and ReasonCode=3 ('channel is too busy') are configured.

In addition, the congestion control for the list related to the subscription may be used to modify a subscription corresponding to a resolution or bit rate greater than a preset reference. In this case, the first UE may transmit a second notification related to the subscription modification. The second notification may be set to notificationType=3 ('modification of subscription request') and ReasonCode=3 ('channel is too busy'). Thereafter, the first UE may transmit information related to the format of the modified sensor raw data to the second UE. The second notification may correspond to MSG_HDDataNotification.

That is, the first UE may control a channel utilization rate by modifying the HDD type in the subscription list of the second UE. When the second UE subscribes to a higher-level video resolution or a higher bitrate (e.g., 1080p, 30 fps), the first UE may stop sending the original subscribed type of HDD to the second UE. The first UE may transmit, to the second UE, an HDD Notification in which notificationType=3 ('modification of subscription request') and ReasonCode=3 ('channel is too busy') are configured. The first UE may transmit, to the second UE, an HDD advertisement having a modified HDD transmission format (e.g., low-level video resolution, bitrate of 720p or less, 25 fps).

As described above, when raw data is shared and exchanged through the feedback process and congestion control, an exchange procedure may be configured not to use unnecessary resources, and congestion control may be performed to implement efficient transmission.

The first UE based on the above-described content may include: at least one processor, and at least one memory operatively connected to the at least one processor, and configured to store instructions such that the at least one processor performs specific operations by executing the instructions, wherein the specific operations include broadcasting a message related to sharing of sensor raw data; receiving, from the second UE, a subscription related to sharing of sensor raw data; and transmitting a notification for the subscription to the second UE. Based on reception of a feedback related to the sensor raw data from the second UE, the first UE may perform congestion control for one or more of the list related to the subscription or the format of the sensor raw data.

In addition, a processor is configured to perform operations for the user equipment (UE), wherein the operations include: broadcasting a message related to sharing of sensor raw data; receiving, from the second UE, a subscription related to sharing of sensor raw data; and transmitting a notification for the subscription to the second UE. Based on reception of a feedback related to the sensor raw data from the second UE, the first UE may perform congestion control for one or more of the list related to the subscription or the format of the sensor raw data.

In addition, a non-volatile computer-readable storage medium configured to store at least one computer program including instructions that, when executed by at least one processor, cause the at least one processor to perform specific operations for a user equipment (UE) may include: broadcasting a message related to sharing of sensor raw data; receiving, from the second UE, a subscription related to sharing of sensor raw data; and transmitting a notification for the subscription to the second UE. The first UE may perform congestion control for one or more of the list related to the subscription or the format of the sensor raw data.

In order to perform congestion control of a channel to be used for HDD transmission, a notification type and a reason code can be added to HDDataNotification, and MSG_HDDataNotification (HDDN) message is shown in Table 7 below.

TABLE 7

HDDataNotification ::= SEQUENCE {
   sourceID OCTET STRING (SIZE(1)),
      -- Temporary vehicle ID / RSU ID. HDDN source.
   targetID OCTET STRING (SIZE (8)),
      -- Target temporary vehicle ID / RSU ID. HDDS source.
   subscriptionID OCTET STRING (SIZE (1)),
      -- ID of subscription request from HDDS source
   notificationType NotificationType,
      -- Type of notification message
   reasonCode ReasonCode OPTIONAL,
      -- Reason for this notification
}
NotificationType ::= ENUMERATED{
   rejection of subscription request (0),
   termination of subscription request (1),
   keep-alive (2),
   modification of subscription request (3),
   ...
}
ReasonCode ::= ENUMERATED{
   unspecified (0),
   request unsupported (1),
   unexpected or unsupported position of requester (2),
   channel is too busy (3),
   ...
}

In addition, MSG_HDDataFeedback (HDDF), which is a message used for feedback, is shown in Table 8 below.

TABLE 8

HDDataFeedback ::= SEQUENCE {
   sourceID OCTET STRING (SIZE(1)),
      -- Temporary vehicle ID / RSU ID. HDDN source.
   targetID OCTET STRING (SIZE(8)),
      -- Target temporary vehicle ID / RSU ID. HDDS source.

TABLE 8-continued

```
    subscriptionID OCTET STRING (SIZE(1)),
    -- ID of subscription request from HDDS source
    feedbackType FeedbackType,
    -- Type of feedback message
}
FeedbackType ::= ENUMERATED{
    no data received (0),
    slowed packet delivery speed (1),
    frequent packet loss (2),
    format of HDD unsupported (3),
    ...
}
```

Figure 13:
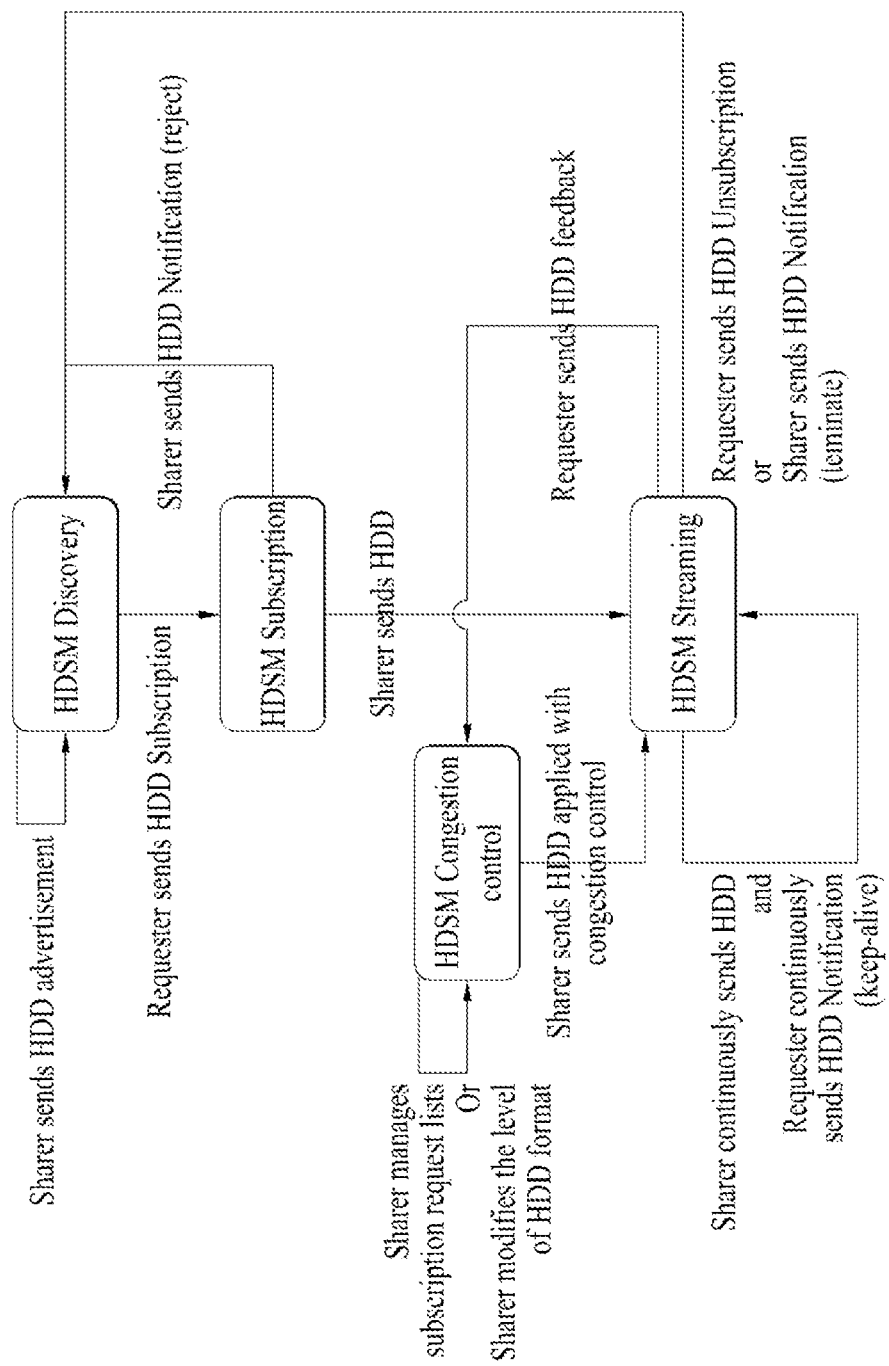

FIG. 13 illustrates a flowchart related to the above-described congestion control. Referring to FIG. 13, HRSU or HV may serve as a first UE or a second UE according to a basic HDSM state. HRSU or HV can execute several instances of the HDSM protocol concurrently with one or more corresponding second UEs or first UEs, and can play other roles.

In the HDSM discovery state (HDSM discovery of FIG. 13), the first UE may transmit HDD (high definition data) advertisement to the HV to inform the HV of the HDD sharing function. HDD advertisement may indicate the availability of one or more sensors and corresponding usable formats. HDD Advertisement may also specify a keep-alive (connection maintenance) interval for subscriptions. The second UE may receive the HDD advertisement and transmit the HDD subscription to the first UE, thereby requesting HDD reception.

In the HDSM subscription state (HDSM subscription of FIG. 13), the first UE may receive the HDD subscription and check whether to support the request. If support is possible, the first UE may start HDD transmission to an HDD subscription source. If support is impossible, the first UE must transmit, to the second UE, an HDD notification configured with 'notificationType=0' ('rejection of subscription request'). If the second UE does not receive HDD notification or HDD from the first UE, another HDD subscription can be transmitted to the first UE.

In the HDSM streaming state (HDSM streaming of FIG. 13), the first UE can continuously transmit the HDD to the second UE. The second UE receives HDD and periodically transmits HDD notification in which notificationType is set to 2 ('keep-alive') and ReasonCode is set to 0 ('none') according to the keep-alive (connection maintenance) interval specified in the HDD advertisement of the first UE. When the second UE no longer needs the HDD, the second UE transmits an HDD subscription cancellation message to the first UE so that the subscription can be cancelled. When the first UE receives the HDD subscription cancellation message, the first UE should stop sending the HDD to the second UE.

When the first UE tries to stop sending the HDD to the second UE before receiving an HDD unsubscription message, for example, when the keep-alive (connection maintenance) message is not received during a specified keep-alive interval, the notification type is set to 1 ('cancellation of subscription'). HDD transmission should be stopped only after the configured HDD notification is transmitted to the applicant. When the HRSU determines that the HV has left the communication region, for example, after continuous transmission failure occurs for a certain period of time, HDD transmission may be stopped without transmission of the HDD notification. The first UE may send the HDD notification with the following information. Temporary disconnection of communication for a short period of time may be expected due to the mobility environment, and a case in which continuous transmission failure is used to confirm the absence of the second UE should be considered. An HDSM message may include MSG_HDDataAdvertisement (HDDA), MSG_HDDataSubscription (RDDS), MSG_HDDataUnsubscription (HDDU), and MSG_HDDataNotification (HDDN).

Subsequently, in the HDSM streaming state, the first UE continues to transmit the HDD to the second UE. When the second UE successfully receives the HDD satisfying the requirements of the second UE from the first UE, based on the keep-alive interval in the HDD advertisement from the first UE, the second UE may set notificationType to 2 ('keep-alive') and may transmit the HDD notification configured with ReasonCode=0 ('none').

However, while receiving the HDD, if the second UE finds a problem (e.g., slow transmission of the HDD, frequent packet loss) in order to obtain useful information from the received HDD, the second UE transmits an HDD feedback message to inform the first UE of the problem that occurs in the second UE. Thereafter, the first UE performs congestion control (HDSM congestion control of FIG. 13), and a detailed description thereof has been given in detail above so that the same or similar content as described above can be replaced with the above description.

Hereinafter, a method for providing the sensor raw data sharing on-demand in relation to the above description will be described in detail.

Upon receiving a request for sharing raw data for a sensor from the second UE, the first UE may transmit the following SensorSharingMsg to the second UE.

In order to share the raw data (sensor raw data) measured by the sensor, information as to whether the raw data is provided and the raw data information list are added to SensorSharingMsg, so that this SensorSharingMsg can be defined in the example of Table 9 and ASN.1 format.

TABLE 9

```
SensorSharingMsg ::= SEQUENCE {
    msgCnt MsgCount, -- Sequence number
    id OCTET STRING (SIZE(8)), -- temporary vehicle ID / RSU ID.
    SSM source.
    equipmentType EquipmentType, -- Sender type
    secMark DSecond, -- SSM transmission time
    refPos Position3D, -- Sender reference position
    objCount DetectedObjectCount, -- Number of reported detections
    objects DetectedObjectList -- detected objects
    rawDataProvides BOOLEAN,
    rawDataInfoList rawDataInfoListType,
    ...
}
```

In Table 9, rawDataProvides can be expressed as Boolean values, and may indicate whether the source ITS-station provides raw data in a situation where the raw data was requested from the source ITS-station. That is, if 'true' is decided, this means that raw data can be provided, and if 'false' is decided, this means that raw data is not provided even if the raw data is requested. In addition, rawDataInfoList: this means a list in which information about raw data measured by the sensor owned by the source ITS-station is listed.

rawDataInfoListType may consist of 1 or more 'rawDataInfo' and 3 or less 'rawDataInfo' in the form shown in Table 10 below. Alternatively, rawDataInfoListType included in SensorSharingMsg may be configured with at least one rawDataInfo as shown in the form below.

TABLE 10

```
rawDataInfoListType ::= SEQUENCE (SIZE(1..3)) OF rawDataInfoType
``` rawDataInfoType may be composed of ASN.1 format as shown in Table 11 below.

TABLE 11

```
rawDataInfoType ::= SEQUENCE {
   rawDataId OCTET STRING (SIZE(8)), -- raw data id, temporary
   sensor sensorType, -- sensor type
   rawDataCategory rawDataCategoryType, -- raw data category
   videoCodec videoCodecType,
   audioCodec audioCodecType,
   image imageType,
   ...
}
sensorType ::= ENUMERATED {camera(0), lidar(1), radar(2), ...}
rawDataCategoryType ::= ENUMERATED {video(0), image(1), audio(2), ...}
videoCodecType ::= ENUMERATED { H.264/AVC(0), H.265/HEVC(1), AV1(2), VP9(3),
H.266/VVC(4), ...}
audioCodecType ::= ENUMERATED { AAC(0), AAC-LC(1), HE-AAC+v1&v2(2), Opus(3),
G.711(4), ...}
imageType ::= ENUMERATED {jpg(0), png(1), gif(2), bmp(3) ...}
```

In Table 11, descriptions of the respective parameters are as follows.

rawDataId: 'rawDataId' can be defined as OCTET STRING SIZE(8), and has a unique value among raw data measured by one source ITS-station.

Sensor: 'Sensor' can be defined as 'sensorType DF', indicates the type of a measurement sensor, and may be one of a camera, a Lidar, and a radar rawDataCategory: 'rawDataCategory' indicates the type of measured raw data, and has any one of video, image, and audio file types.

videoCodec: If the measured raw data is a video file, 'videoCodec' indicates the used video encoding codec, and may be any one of 5 codecs.

audioCodec: If the measured raw data is an audio file, 'audioCodec' means the used audio encoding codec, and may be any one of 5 codecs.

Image: If the measured raw data is an image file, 'Image' indicates the type of image, and may be any one of jpg, png, gif, and bmp.

Continuously, the ITS-station, which has received the sensor sharing message from the source ITS-station providing the raw data measured by the sensor, can request, from the source ITS-station, raw data that can be used as a method for reducing the number of risk factors through decoding. Alternatively, the ITS-station that has received the sensor sharing message may construct RequestRawData as shown in Table 12 based on its own predicted driving direction, resolution, codec, identification (ID) information, and/or data size.

In Table 11, the respective parameters are as follows.

sourceId: 'sourceId' is defined as an octet string (size of 8) type, and indicates an identifier (ID) of a provider (i.e., source ITS-station) that provides raw data.

requesterId: 'requesterId' is defined as an octet string (size of 8) type, and indicates an identifier (ID) of a requester ITS-station requesting raw data.

rawDataId: 'rawDataId' is defined as an octet string (size of 8) type, and refers to an ID of raw data that is uniquely distinguished among the source's raw data.

maxWidth: 'maxWidth' is defined as an integer. When the type of requested raw data is video or image, 'maxWidth' means a pixel value of a maximum width that can be supported by the requesting ITS-station.

maxHeight: 'maxHeight' is defined as an integer value. When the type of requested raw data is video or image, 'maxHeight' means a pixel value of a maximum width that can be supported by the requesting ITS-station.

maxStorage: 'maxStorage' is defined as an integer value, and means a maximum storage space size (i.e., storage size in bytes) that can be supported by the ITS-station requesting all raw data regardless of the type of requested raw data.

rawDataPosition: 'rawDataPosition' can be expressed as a value in the form of Position3D, and means position information of the raw data requested to be captured by the sensor installed in the source ITS-Station. For example, when a

TABLE 12

```
RequestRawData ::= SEQUENCE {
   sourceId OCTET STRING (SIZE(8)), -- raw data provider id
   requesterId OCTET STRING (SIZE(8)), -- requester id
   rawDataId OCTET STRING (SIZE(8)), -- raw data id in the source's raw data info list
   maxWidth INTEGER, -- pixel (video, image)
   maxHeight INTEGER, -- pixel (video, image)
   maxStorage INTEGER, -- storage size in byte (all)
   rawDataPosition Position3D, -- captured position of raw data by sensor
   supportVideoCodec supportVideoCodecType, (video)
   supportAudioCodec supportAudioCodecType, (audio)
   supportImage supportImageType, (image)
   ...
}
``` vehicle running on the road attempts to overtake in the left direction, raw data about the left front side from the measurement ITS-station rather than raw data about the heading direction of the measurement ITS-station can be requested.

In relation to Table 12, supportVideoCodecType as shown in Table 13 below is optionally provided, so that the requester can additionally provide the source ITS-station with video codec information that can support decoding. Alternatively, supportVideoCodecType may further include information requesting transcoding through a common codec.

TABLE 13

```
supportVideoCodecType ::= BIT STRING {
  H.264/AVC,
  H.265/HEVC,
  AV1,
  VP9,
  H.266/VVC,
  ...
}
```

In addition, by providing supportAudioCodecType as shown in Table 14 and Table 13 below as optional, the requester can additionally provide the source ITS-station with audio codec information that can support decoding.

TABLE 14

```
supportAudioCodecType ::= BIT STRING {
  AAC,
  AAC-LC,
  HE-AAC+v1&v2,
  Opus,
  G.711,
  ...
}
```

In addition, supportImageType as shown in Table 15 below is optionally provided, so that the requester can additionally provide the source ITS-station with image information that can support decoding.

TABLE 15

```
supportImageType ::= BIT STRING {
  JPG,
  PNG,
  GIF,
  BMP,
  ...
}
```

Meanwhile, the response to the raw data may be as shown in Table 16 below.

TABLE 16

```
ResponseRawData ::= SEQUENCE {
  sourceId OCTET STRING (SIZE(8)), -- raw data provider id
  requesterId OCTET STRING (SIZE(8)), -- requester id
  rawDataId OCTET STRING (SIZE(8), -- raw data id in the source's raw data info list
  result resultType, -- accept/reject/error
  rawData rawDataType, -- raw data (accept #z,41 )
  ...
}
resultType ::= ENUMERATED {accept(0), reject(1), error(2), ...}
rawDataType ::= SEQUENCE {
  secStart DSecond, -- raw data capture start time (all)
  secEnd DSecond, -- raw data capture end time (video, audio)
  width INTEGER, -- pixel (video, image)
  height INTEGER, -- pixel (video, image)
  size INTEGER, -- byte (all)
  duration INTEGER, -- seconds (video, audio)
  bitrate INTEGER, -- bps (bit per second) (video, audio)
  framerate INTEGER, -- fps (frame per second) (video)
  aspectRatio aspectRatioType, -- aspect ratio (video, image)
  samplingrate INTEGER, -- audio sampling rate (Hz)
  rawDataBytes OCTET STRING (SIZE(size)),
  rawDataLocation OCTET STRING (SIZE(255)),
  ...
}
aspectRatio Type ::= ENUMERATED {1.85:1(0), 2:39:1(1), 4:3(2), 16:9(3), 3:2(4), ...}
```

In Table 16, the respective parameters are as follows.

sourceId: 'sourceId' is defined as an octet string (size of 8) type, and indicates an identifier (ID) of a provider providing raw data.

requesterId: 'requesterId' is defined as an octet string (size of 8) type, and indicates an identifier (ID) of a requester requesting raw data.

rawDataId: 'rawDataId' is defined as an octet string (size of 8) type, and refers to an ID of raw data that has a unique value among the list of raw data measured by the source (provider) ITS-station.

Result: 'Result' means a resultant value of a response, and may have any one of three values (accept/reject/error). If the value of 'Result' is 'Accept', detailed information of raw data is transmitted together with 'Result'.

rawData: 'rawData' means detailed information of raw data. If the value of 'Result' is 'Accept', 'rawData' can be transmitted and defined as 'rawDataType DF'. Alternatively, rawData may include at least one of the following pieces of information.

secStart: 'secStart' is defined in the form of DSecond, means the time when capture of raw data is started, and can be applied to all types of raw data.

secEnd: 'secEnd' is defined in the form of DSecond, and means the time when capture of raw data is ended. In case of video or audio raw data, the corresponding time is required.

Width: 'Width' may have an integer value, and is a pixel value indicating a width of video, image raw data.

Height: 'Height' may have an integer value, and is a pixel value indicating a height of raw video and image data.

Size: 'Size' may have an integer value, refers to the size value of raw data applied to all types of raw data, and is represented in bytes.

Duration: 'Duration' can be expressed as an integer value, and the duration (period) of video and audio raw data can be expressed in units of seconds. Duration should be equal to a difference between secStart and secEnd values.

Bitrate: 'Bitrate' can be expressed as an integer value, and means the number of bits to be transmitted per second. In the case of video and audio raw data, 'Bitrate' is expressed as a bit per second (bps) value.

Framerate: 'Framerate' can be expressed as an integer value. In the case of video raw data, 'Framerate' is expressed as a frame per second (fps) value.

aspectRatio: 'aspectRatio' means an aspect ratio in case of raw video and image data.

'Samplingrate' can be expressed as an integer value, and means a sampling rate (Hz) of the raw audio data.

rawDataBytes: Since raw data is embedded in a response message, 'rawDataBytes' is transmitted with the octet string (size). Such transmission is possible when the size of raw data is small.

rawDataLocation: 'rawDataLocation' means a method for notifying the URL address value of the server in a situation where the raw data is not embedded in the response message and the resultant raw data is then uploaded to a specific server. 'rawDataLocation' is expressed as an octet string (size of 255).

When raw data is requested and the resultant raw data is received as a response from the source ITS-station, the requester (request ITS station) sends a feedback message to the source (source ITS station) so that the requester can confirm reception of the raw data and can check the transmission status and environment. Alternatively, as shown in Table 17 below, the request ITS-station may report, to the source ITS-station, acknowledgement (ACK) information of raw data and information about the reception state of the raw data.

'receivedSize' may have a smaller size than the total raw data, and a bandwidth of a currently used transmission channel can be obtained in consideration of the size ratio and the interval between messages. 'Receiving' means a transmission state. As a waiting state, 'receivedSize' has a smaller size than the total raw data. A bandwidth of a transport channel currently being used can be obtained in consideration of the size ratio and the interval between messages. 'noData' means that no raw data has been received until the moment when a feedback message is sent, and 'receivedSize' means 0.

For congestion control, congestion control using feedback messages and congestion control using characteristics of raw data can be used. A detailed description of such congestion control will be explained in detail.

The source ITS-station may collect feedback messages transmitted by the requester ITS-stations, and may thus analyze the degree of congestion of the channel currently being used. For example, if all requester ITS-stations send feedback messages by indicating their status as 'Finish (success)' within the time range expected by the source ITS-station, the source ITS-station may derive the analysis result that the congestion status of the corresponding channel is good. However, as another example, when there were 10 ITS-S requesters, 5 ITS-stations enter the 'finish (success)' status within a time range expected by the source ITS-station, but when the remaining 5 ITS-stations have transmitted feedback messages including various statuses such as 'Receiving', 'Waiting', 'noData', etc., the source ITS-station recognizes that the congestion of the currently used channel must be controlled, and controls the congestion of the channel using an appropriate method. The criterion and control method for determining channel congestion by the source ITS-station may vary depending on the implementation of the source ITS-station. Alternatively, the source ITS-station may analyze or estimate the congestion of the channel in consideration of the reception rate of the feedback messages from the requester ITS-stations, and may

TABLE 17

```
FeedbackOfRawData ::= SEQUENCE {
   sourceId OCTET STRING (SIZE(8)), -- raw data provider id
   requesterId OCTET STRING (SIZE(8)), -- requester id
   rawDataId OCTET STRING (SIZE(8)), -- raw data id in the source's raw data info list
   status statusType, -- finish(success)/waiting/receiving/noData
   receivedSize INTEGER, -- the size of received raw data
   ...
}
statusType :: = ENUMERATED {finish(success)(0), waiting(1), receiving(2), noData(3) ...}
```

In Table 17, the respective parameters are as follows.

sourceId: 'sourceId' is expressed as an octet string (size of 8), and indicates an identifier (ID) of a provider providing raw data.

requesterId: 'requesterId' is expressed as an octet string (size of 8), and indicates an identifier (ID) of a requester requesting raw data.

rawDataId: 'rawDataId' is expressed as an octet string (size of 8), and refers to an ID of raw data that has a unique value among the list of raw data measured by the source (provider) ITS-station.

Status: 'Status' means that raw data is being received or was received, and may have any one of finish(success)/waiting/receiving/noData values. 'Finish' indicates a state in which the raw data was completely received. 'receivedSize' may have the same value as 'raw data size'. 'Waiting' means a state in which raw data reception is temporarily stopped.

perform an operation of adjusting the congestion of the channel based on the analyzed or estimated congestion.

The source ITS-station sensing raw data can measure a channel busy ratio (CBR) of the currently used channel through a CBR measurement method being used in each access layer technology previously defined. If the CBR is increased, the message generation condition is adjusted, and the frequency to be used for message transmission is also adjusted, so that the CBR can be lowered. Alternatively, the size of raw data can be reduced by a method for increasing the codec compression rate of raw data sensed by the sensor. Alternatively, the movement of the detected object can be determined by analyzing the raw data of the sensor. A method for transmitting raw data only when the object shows a motion that is equal to or higher than a predetermined reference is used, so that the CBR can be adjusted.

Alternatively, the source ITS-station may determine whether congestion control is required based on information on CBR or CR, and if congestion control is required, the message generation condition can be adjusted, the period in which a message including raw data is transmitted can be adjusted, and the codec compression rate of the raw data can be adjusted. When the movement of a specific threshold or more is sensed, such congestion can be controlled through transmission of at least one of messages including raw data.

Figure 14:
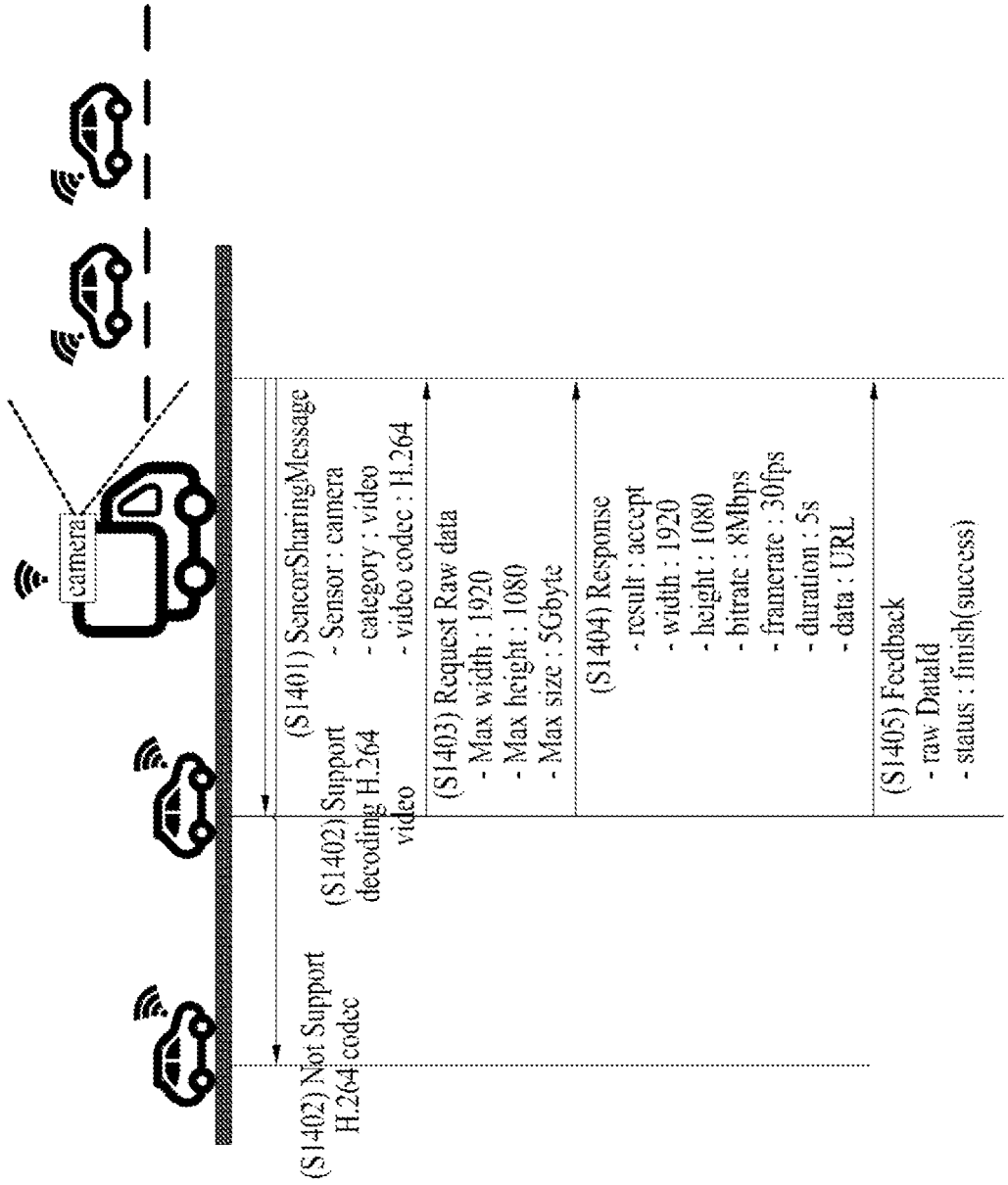

FIG. 14 illustrates an embodiment related to the above description. Referring to FIG. 14, a truck equipped with a camera sensor broadcasts a sensor sharing message (SSM) measured by the camera sensor to the vehicles A and B (S1401). Vehicle A does not support the video codec (H.264) indicated by the SSM, and Vehicle B can decode the corresponding video codec (S1402). In order to analyze information of the object informed by the SSM received from the truck through raw data, Vehicle B transmits a message requesting the request raw data to the truck (S1403). Vehicle B can transmit information about a supportable resolution and information about a maximum storage space size. Alternatively, the message requesting the request raw data may be configured to include the above-described elements of RequestRawData. When the truck having received the request message can provide the raw data requested by Vehicle B, the truck transmits a response message along with the acceptance result and detailed information related to such raw data (S1404). When the requester having received the response message from the source successfully receives the raw data, the requester transmits a feedback message including the 'finish (success)' status to the status (S1405). Alternatively, the requester can send a feedback message by applying the status information according to the degree of reception. Alternatively, the feedback may be configured to include the above-described FeedbackOfRawData element. The source may analyze the feedback message received from the requesters, may recognize the degree of congestion of the channel, and may use the congestion control scheme.

Figure 15:
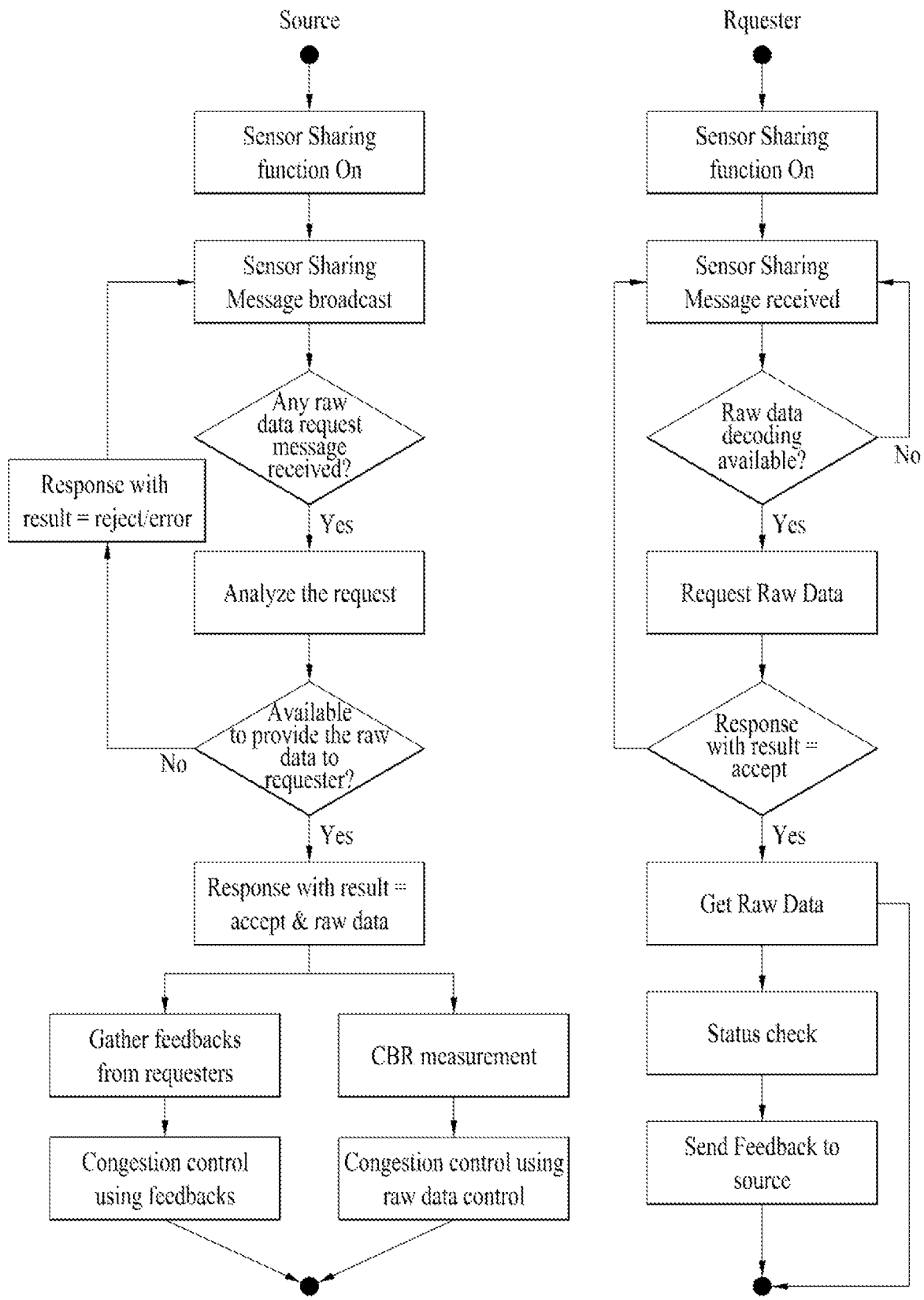

FIG. 15 illustrates an embodiment related to the above description.

In order to share the raw data measured by the sensor with a plurality of vehicles included in a specific zone/region having a predefined range, the raw data dimension and the raw data information corresponding to the region are added to SensorSharingMsg, and SensorSharingMsg can be defined as ASN.1 format as shown in Table 18. Alternatively, when the ITS station enters a specific region, transmission of raw data related to the sensor of the ITS station may be triggered. When the ITS station leaves the specific region, transmission of the raw data may be stopped. The raw data may include sensing information in the specific region. Here, whether or not to enter the specific region may be determined based on a preconfigured specific reference position and predetermined radius information or based on preconfigured zone ID information.

TABLE 18

SensorSharingMsg ::= SEQUENCE {
  msgCnt MsgCount, -- Sequence number
  id OCTET STRING (SIZE(8)), -- temporary vehicle ID / RSU ID.
  SSM source.
  equipmentType EquipmentType, -- Sender type
  secMark DSecond, -- SSM transmission time
  refPos Position3D, -- Sender reference position
  objCount DetectedObjectCount, -- Number of reported detections
  objects DetectedObjectList -- detected objects TABLE 18-continued rawDataDimension DimensionType,
  rawDataInfo RawDataInfoType,
  ...
} rawDataDimension: 'rawDataDimension' can be expressed as four Position3D values meaning four vertices. Source ITS-station refers to position information of a specific region/zone designated to provide raw data. rawDataDimension can be expressed as DimensionType, and can also be expressed in the following ASN.1 format. Alternatively, 'rawDataDimension' may include information about a specific reference position and a predetermined radius, or may include information about a zone ID corresponding to a specific region. Alternatively, the ITS-station may receive information on the specific reference position and a predetermined distance from the base station (BS) through RRC signaling, and determine a specific zone ID based on the received specific reference position and predetermined distance. Here, the specific reference position may be information on latitude and longitude.

TABLE 19

DimensionType ::= SEQUENCE {
  leftTop Position3D, -- raw data capture start time (all)
  leftBottom Position3D, -- raw data capture end time (video, audio)
  rightTop Position3D, -- pixel (video, image)
  rightBottom Position3D, -- pixel (video, image)
  ...
}

'rawDataInfo' refers to raw data information corresponding to 'rawDataDimension' measured by the sensor owned by the source ITS-station. The raw data information can be expressed in ASN.1 format as shown in Table 20 below.

TABLE 20

RawDataInfoType ::= SEQUENCE {
  secStart DSecond, -- raw data capture start time (all)
  secEnd DSecond, -- raw data capture end time (video, audio)
  width INTEGER, -- pixel (video, image)
  height INTEGER, -- pixel (video, image)
  size INTEGER, -- byte (all)
  duration INTEGER, -- seconds (video, audio)
  bitrate INTEGER, -- bps (bit per second) (video, audio)
  framerate INTEGER, -- fps (frame per second) (video)
  aspectRatio aspectRatioType, -- aspect ratio (video, image)
  samplingrate INTEGER, -- audio sampling rate (Hz)
  rawDataBytes OCTET STRING (SIZE(size)),
  rawDataLocation OCTET STRING (SIZE(255)),
  ...
}
aspectRatioType ::= ENUMERATED {1.85:1(0), 2.39:1(1),
  4:3(2), 16:9(3), 3:2(4), ...}

Figure 16:
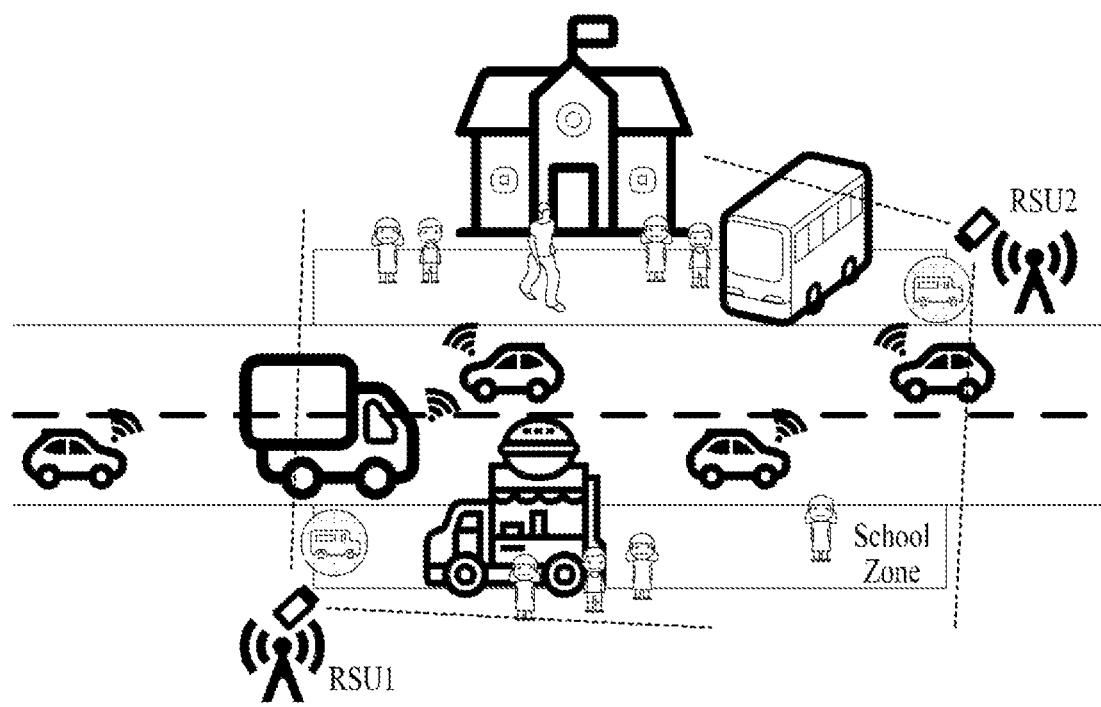
Figure 17:
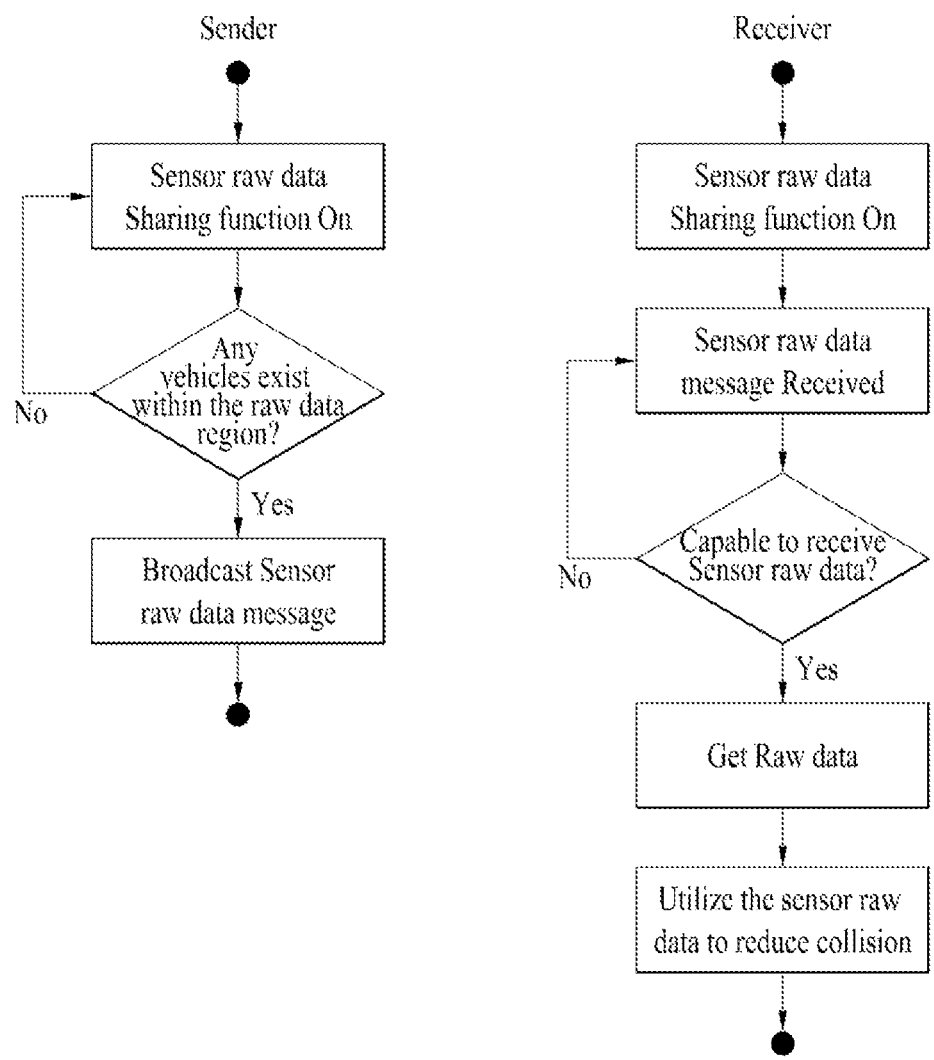

FIG. 16 illustrates another embodiment, and FIG. 17 shows a flowchart related to the embodiment of FIG. 16. In FIG. 16, RSU1 and RSU2 can transmit raw data detected by their sensors to all vehicles belonging to a school zone before entering the school zone and leaving the school zone.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
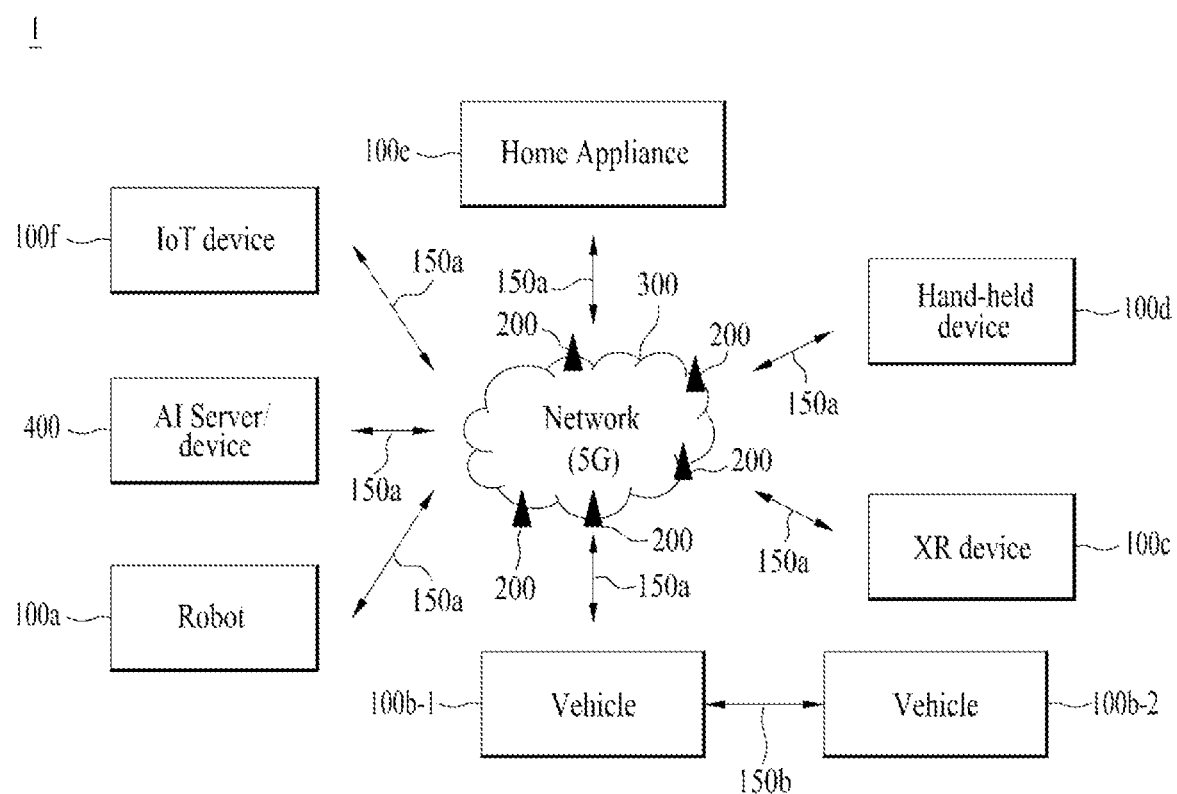
FIGS. 18 to 24 are block diagrams illustrating various devices to which embodiment(s) of the present disclosure are applicable.

FIG. 18 illustrates a communication system 1 applied to the present disclosure.

Referring to FIG. 18, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 19:
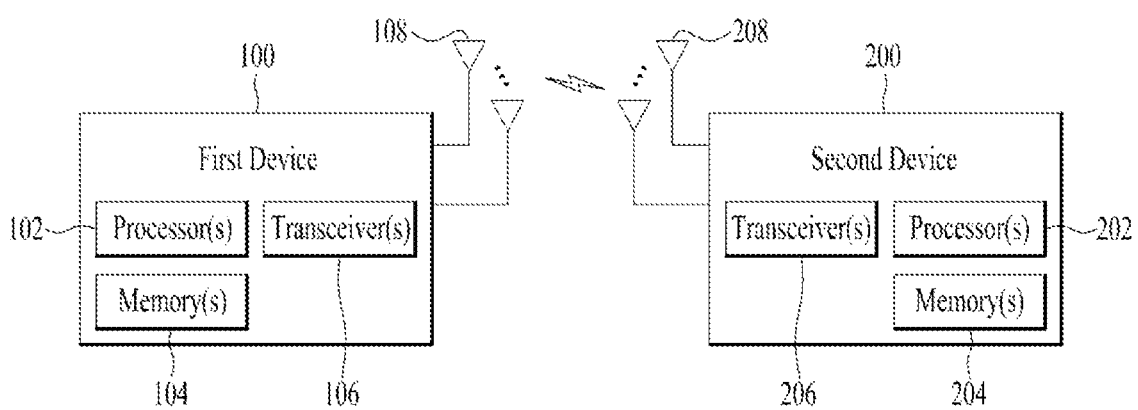

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
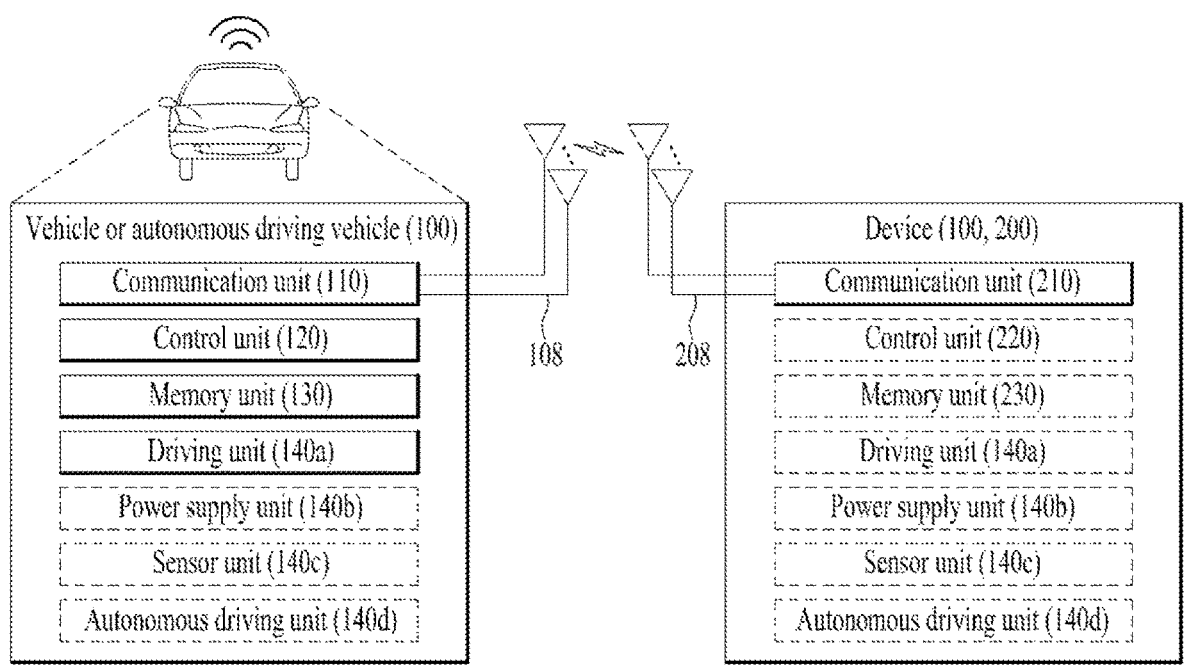

Examples of a Vehicle or an Autonomous Driving Vehicle Applicable to the Present Disclosure FIG. 20 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 21:
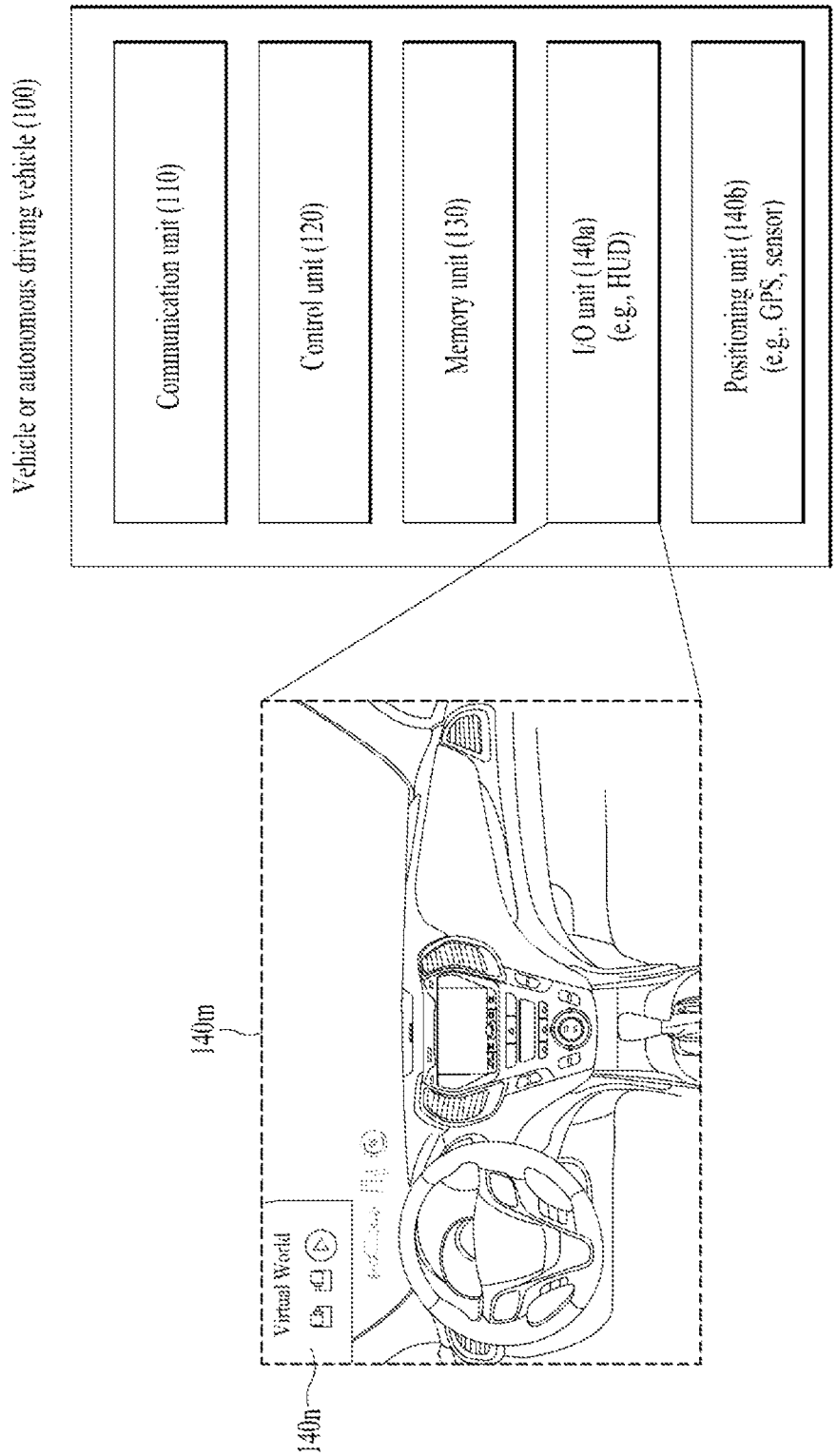

FIG. 21 illustrates a vehicle applied to the present disclosure. The vehicle may be implemented as a transport means, an aerial vehicle, a ship, etc.

Referring to FIG. 21, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 22:
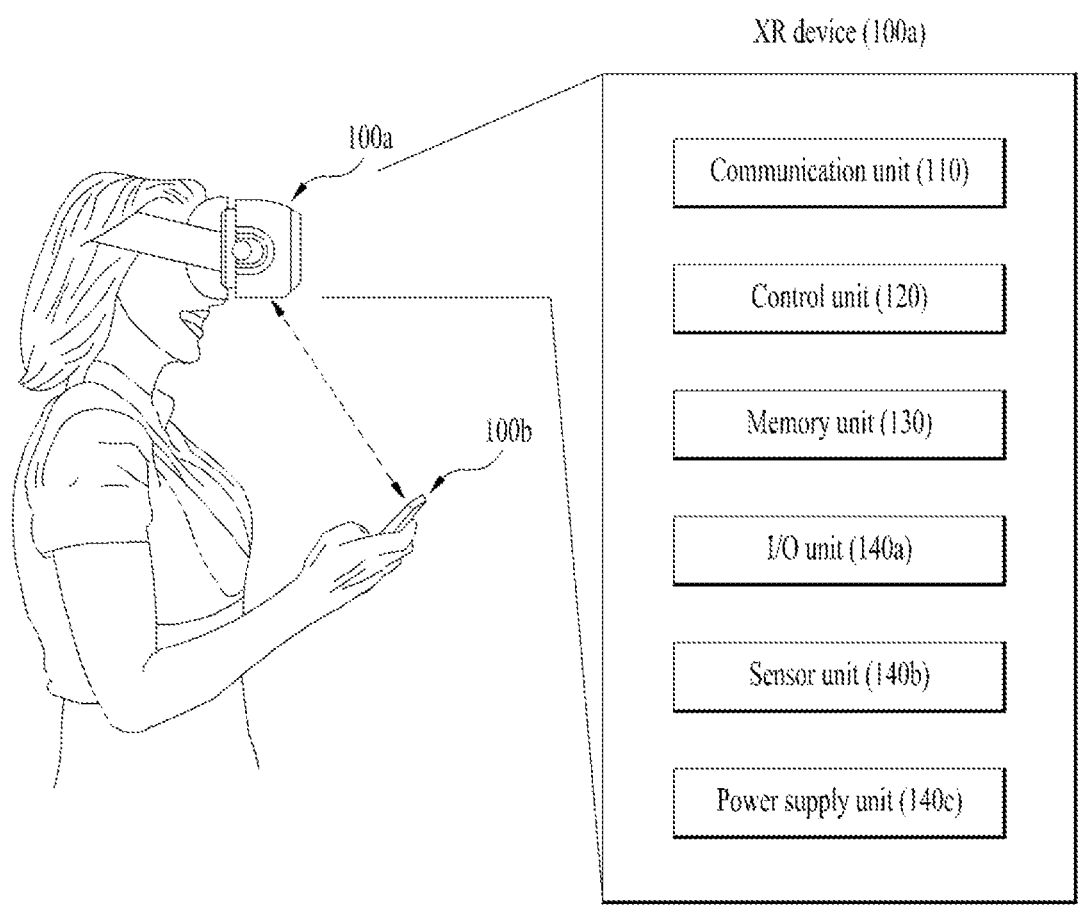

FIG. 22 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 22, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 23:
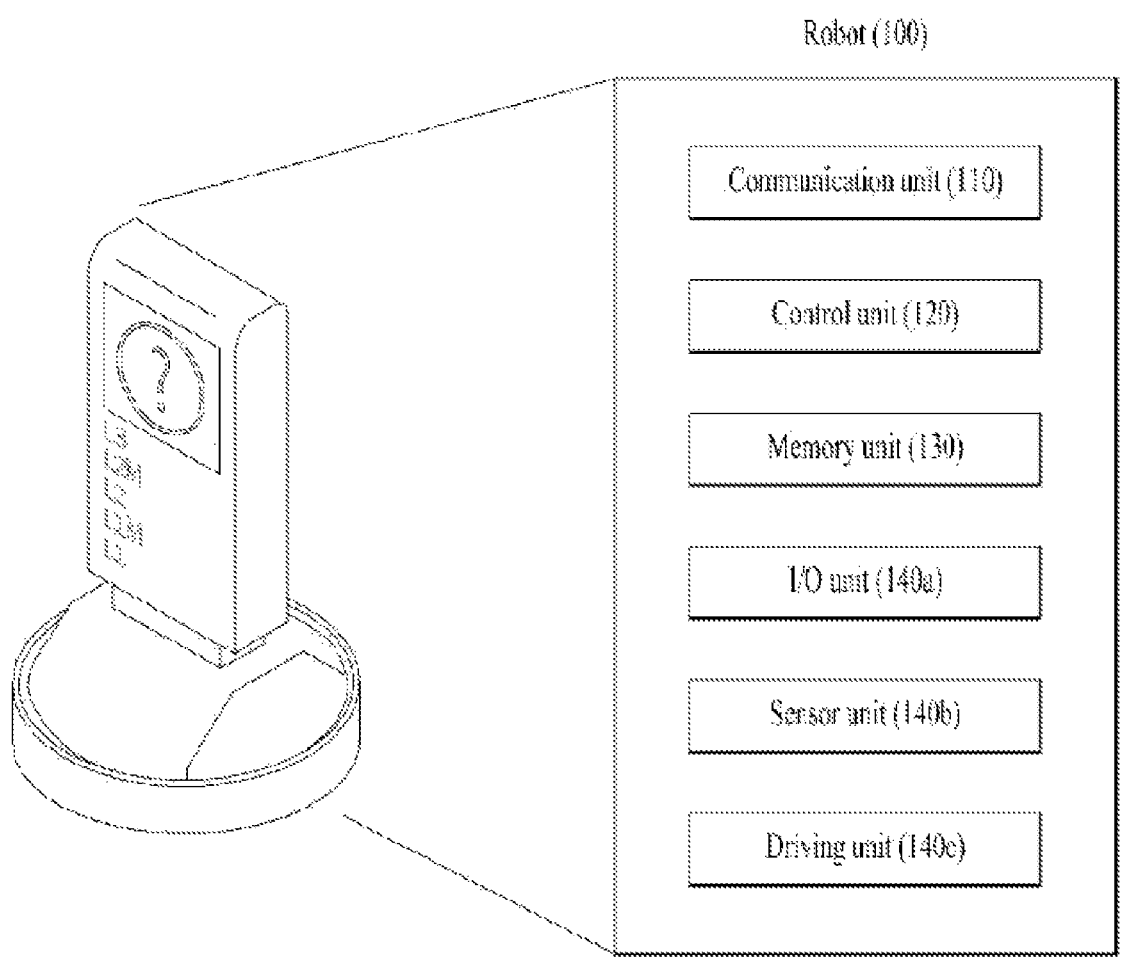

FIG. 23 illustrates a robot applied to the present disclosure. The robot may be categorized into an industrial robot, a medical robot, a household robot, a military robot, etc., according to a used purpose or field.

Referring to FIG. 23, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 19, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device to which the Present Disclosure is Applied.

Figure 24:
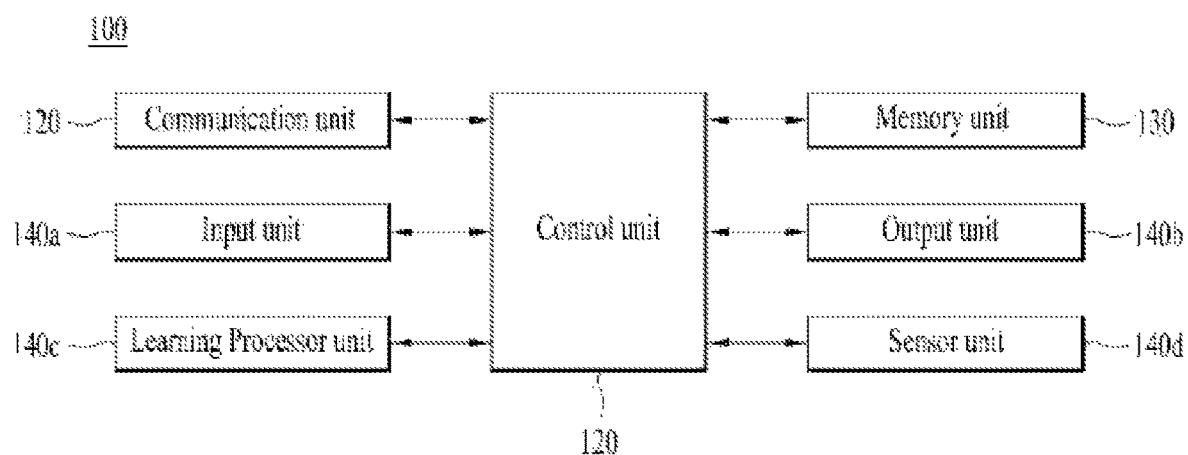

FIG. 24 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 24, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 19, respectively.

The communication unit 110 may transmit and receive wired/radio signals (e.g., sensor information, user input, learning models, or control signals) to and from external devices such as other AI devices (e.g., 100*x*, 200, or 400 of FIG. 18) or an AI server (e.g., 400 of FIG. 18) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 18). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 18). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. A method for operating a first user equipment (UE) related to high definition stream management (HDSM) in a wireless communication system comprising:
   transmitting, by the first UE, a message related to sharing of sensor raw data;
   receiving, by the first UE, a subscription related to the sharing of the sensor raw data from a second user equipment (UE); and
   transmitting, by the first UE, a notification for the subscription to the second UE,
   wherein
      based on a situation in which the first UE receives feedback for the sensor raw data from the second UE, the first UE performs congestion control for at least one of a list related to the subscription or a format of the sensor raw data.

2. The method according to claim 1, wherein:
   the congestion control for the list related to the subscription is to terminate any one of two or more subscriptions of the second UE.

3. The method according to claim 2, wherein:
   transmission of raw data having a larger channel bandwidth from among the two or more subscriptions is stopped.

4. The method according to claim 2, wherein:
   the first UE transmits a first notification related to the termination of the subscription.

5. The method according to claim 4, wherein: the first notification is configured with notificationType=1 which indicates termination of subscription request, and ReasonCode=3 which indicates channel is too busy.

6. The method according to claim 1, wherein:
   the congestion control for the list related to the subscription is to modify a subscription corresponding to a resolution or bitrate that is equal to or greater than a preset reference.

7. The method according to claim 6, wherein:
   the first UE transmits a second notification related to modification of the subscription.

8. The method according to claim 7, wherein: the second notification is configured with notificationType=3 which indicates modification of subscription request, and ReasonCode=3 which indicates channel is too busy.

9. The method according to claim 8, wherein:
   the second notification corresponds to MSG_HDDataNotification.

10. The method according to claim 7, wherein:
    the first UE transmits, to the second UE, information related to a format of the modified sensor raw data.

11. A first user equipment (UE) for use in a wireless communication system comprising:
    at least one processor; and
    at least one computer memory operatively connected to the at least one processor, and configured to store instructions such that the at least one processor performs specific operations by executing the instructions,
    wherein the specific operations include:
       broadcasting a message related to sharing of sensor raw data;
       receiving a subscription related to the sharing of the sensor raw data from a second user equipment (UE); and
       transmitting a notification for the subscription to the second UE,
    wherein
       based on a situation in which the first UE receives feedback for the sensor raw data from the second UE, the first UE performs congestion control for at least one of a list related to the subscription or a format of the sensor raw data.

12. A processor configured to perform operations of a user equipment (UE) in a wireless communication system comprising:
    performing the operations:
    wherein the operations include:
       broadcasting a message related to sharing of sensor raw data;
       receiving a subscription related to the sharing of the sensor raw data from a second user equipment (UE); and
       transmitting a notification for the subscription to the second UE,
    wherein
       based on a situation in which the first UE receives feedback for the sensor raw data from the second UE, the first UE performs congestion control for at least one of a list related to the subscription or a format of the sensor raw data.

13. A non-transitory computer-readable storage medium configured to store at least one computer program including instructions that, when executed by at least one processor, cause the at least one processor to perform specific operations for a user equipment (UE) comprising:
    performing the specific operations: wherein the specific operations include:
    broadcasting a message related to sharing of sensor raw data;
    receiving a subscription related to the sharing of the sensor raw data from a second user equipment (UE); and
    transmitting a notification for the subscription to the second UE,
    wherein based on a situation in which the first UE receives feedback for the sensor raw data from the second UE, the first UE performs congestion control for at least one of a list related to the subscription or a format of the sensor raw data.

* * * * *